US011862167B2

(12) United States Patent
Chiba et al.

(10) Patent No.: US 11,862,167 B2
(45) Date of Patent: Jan. 2, 2024

(54) VOICE DIALOGUE SYSTEM, MODEL GENERATION DEVICE, BARGE-IN SPEECH DETERMINATION MODEL, AND VOICE DIALOGUE PROGRAM

(71) Applicant: NTT DOCOMO, INC., Chiyoda-ku (JP)

(72) Inventors: Mariko Chiba, Chiyoda-ku (JP); Taichi Asami, Chiyoda-ku (JP)

(73) Assignee: NTT DOCOMO, INC., Chiyoda-ku (JP)

( * ) Notice: Subject to any disclaimer, the term of this patent is extended or adjusted under 35 U.S.C. 154(b) by 331 days.

(21) Appl. No.: 17/440,871

(22) PCT Filed: Jan. 14, 2020

(86) PCT No.: PCT/JP2020/000914
§ 371 (c)(1),
(2) Date: Sep. 20, 2021

(87) PCT Pub. No.: WO2020/195022
PCT Pub. Date: Oct. 1, 2020

(65) Prior Publication Data
US 2022/0165274 A1  May 26, 2022

(30) Foreign Application Priority Data

Mar. 26, 2019  (JP) .................................. 2019-057917

(51) Int. Cl.
*G10L 15/22* (2006.01)
*G10L 15/02* (2006.01)
*G10L 15/16* (2006.01)

(52) U.S. Cl.
CPC ............ *G10L 15/222* (2013.01); *G10L 15/02* (2013.01); *G10L 15/16* (2013.01)

(58) Field of Classification Search
CPC ........ G10L 15/222; G10L 15/02; G10L 15/16
(Continued)

(56) References Cited

U.S. PATENT DOCUMENTS 10,446,141 B2 * 10/2019 Krishnamoorthy ..... G10L 15/02
2012/0078622 A1 * 3/2012 Iwata ...................... G10L 15/22
704/231

FOREIGN PATENT DOCUMENTS

JP  2018-124484 A  8/2018

OTHER PUBLICATIONS

International Preliminary Report on Patentability and Written Opinion dated Oct. 7, 2021 in PCT/JP2020/000914 (submitting English translation only), 6 pages.
(Continued)

*Primary Examiner* — Susan I McFadden
(74) *Attorney, Agent, or Firm* — Oblon, McClelland, Maier & Neustadt, L.L.P.

(57) ABSTRACT

A spoken dialogue device includes a recognition unit that recognizes an acquired user speech, a barge-in speech control unit that determines whether to engage a barge-in speech, a dialogue control unit that outputs a system response to a user based on a recognition result of the user speech other than the barge-in speech determined not to be engaged by the barge-in speech control unit, a response generation unit that generates a system speech based on the system response, and an output unit that outputs a system speech. When each user speech element included in the user speech corresponds to a predetermined morpheme included in the immediately previous system speech and does not correspond to a response candidate to the immediately previous system speech by a user, the barge-in speech control unit does not engage at least the user speech element.

10 Claims, 19 Drawing Sheets

(58) Field of Classification Search
USPC .......................................................... 704/270
See application file for complete search history.

(56) References Cited

OTHER PUBLICATIONS

International Search Report dated Mar. 31, 2020 in PCT/JP2020/000914 filed on Jan. 14, 2020 (3 pages).

\* cited by examiner

Fig.3 su
tokkyu ressha wo riyo shimasu ss
tokkyu ressha wo riyo shimasu ka

Fig.4 su-2(su)

I take an express train.

ss-2(ss)

Do you take an express train?

Fig.7

| MORPHEME | START TIME | END TIME | REPETITIVE BACK-CHANNEL CODE |
|---|---|---|---|
| tokkyu ressha | 0.12 | 0.29 | 1 |
| wo | 0.29 | 0.32 | 0 |
| riyo | 0.xx | 0.xx | 0 |
| shimasu | 0.xx | 0.xx | 0 |
| ka | 0.xx | 0.xx | 0 |

Fig.9

| MORPHEME | START TIME | END TIME | REPETITIVE BACK-CHANNEL CODE |
|---|---|---|---|
| Do | 0.12 | 0.29 | 0 |
| you | 0.29 | 0.32 | 0 |
| take | 0.xx | 0.xx | 0 |
| an | 0.xx | 0.xx | 0 |
| express | 0.xx | 0.xx | 1 |
| train | 0.xx | 0.xx | 1 |

VOICE DIALOGUE SYSTEM, MODEL GENERATION DEVICE, BARGE-IN SPEECH DETERMINATION MODEL, AND VOICE DIALOGUE PROGRAM

TECHNICAL FIELD

The present disclosure relates to a spoken dialogue system, a model generation device, a barge-in speech determination model, and a spoken dialogue program.

BACKGROUND ART

There are spoken dialogue systems in which dialogues with user speech which is speech produced by users are performed by outputting system speech formed by voices. In such spoken dialogue systems, barge-in speech, which is user speech that is produced to cut off ongoing output of system speech, includes speech that should be responded to and speech that should be ignored rather than engaged by the systems. In order to realize output of appropriate system speech, for example, a technology for controlling whether to engage barge-in speech based on a predicted length or the like of a spoken voice requested as a response from a user when the response is requested from the user using a response voice by a system is known (for example, see Patent Literature 1).

CITATION LIST

Patent Literature

[Patent Literature 1] Japanese Unexamined Patent Publication No. 2018-124484

SUMMARY OF INVENTION

Technical Problem

Barge-in speech includes not only requests for system speech and responses to system speech but also repetitions of content of the system speech and simple back-channels in some cases. When the repetitions of the system speech and the simple back-channels are engaged in control of dialogues, erroneous operations occur in dialogue systems in some cases.

The present disclosure has been devised in view of the foregoing circumstances and an objective of the present disclosure is to prevent an erroneous operation by not engaging a repetition of system speech or a simple back-channel in barge-in speech in dialogue control and achieving an improvement in convenience.

Solution to Problem

To achieve the foregoing objective, according to an embodiment of the present disclosure, a spoken dialogue system performs a dialogue with a user by outputting system speech formed by a voice. The spoken dialogue system includes: an acquisition unit configured to acquire user speech formed by a voice produced by the user; a recognition unit configured to output a recognition result obtained by recognizing the user speech acquired by the acquisition unit as text information; a barge-in speech control unit configured to determine whether to engage barge-in speech which is the user speech produced to cut off ongoing output of the system speech; a dialogue control unit configured to output a system response representing response content with which to respond to the user based on the recognition result corresponding to the user speech other than the barge-in speech determined not to be engaged by the barge-in speech control unit with reference to a dialogue scenario that has a mutual response rule between the user speech and the system speech; a response generation unit configured to generate the system speech based on the system response output by the dialogue control unit; and an output unit configured to output the system speech. The user speech is formed by one or more chronological user speech elements. The dialogue scenario includes a response candidate which is a response assumed for the system speech from the user. When each user speech element corresponds to a predetermined morpheme included in immediately previous system speech which is the system speech output by the output unit immediately before the user speech is produced by the user and does not correspond to an element of the response candidate to the immediately previous system speech in the dialogue scenario, the barge-in speech control unit determines not to engage the user speech element or the user speech including the user speech element.

When the user speech elements included in user speech correspond to predetermined morphemes included in immediately previous system speech, there is a high possibility of the user speech elements corresponding to repetition elements of system speech. When the user speech elements are repetitions of some of the previous system speech and correspond to elements of a response candidate to the immediately previous system speech, the user speech corresponds to elements to be engaged in dialogue control. According to the embodiment, when the user speech elements correspond to predetermined morphemes included in the immediately previous system speech and do not correspond to elements of a response candidate to the immediately previous system speech, it is determined that the user speech elements are not engaged in the dialogue control. Accordingly, an erroneous operation in the spoken dialogue system is prevented and convenience for a user is improved.

Advantageous Effects of Invention

It is possible to prevent an erroneous operation and achieve an improvement in convenience by not engaging a repetition of system speech or a simple back-channel in barge-in speech in dialogue control.

BRIEF DESCRIPTION OF DRAWINGS

FIG. 3 is a diagram illustrating an example of user speech and system speech.

FIG. 4 is a diagram illustrating an example of the user speech and the system speech.

FIG. 7 is a diagram illustrating a process of granting a repetitive back-channel code to a morpheme included in system speech.

FIG. 9 is a diagram illustrating a process of granting a repetitive back-channel code to a morpheme included in system speech.

DESCRIPTION OF EMBODIMENTS

Figure 1:
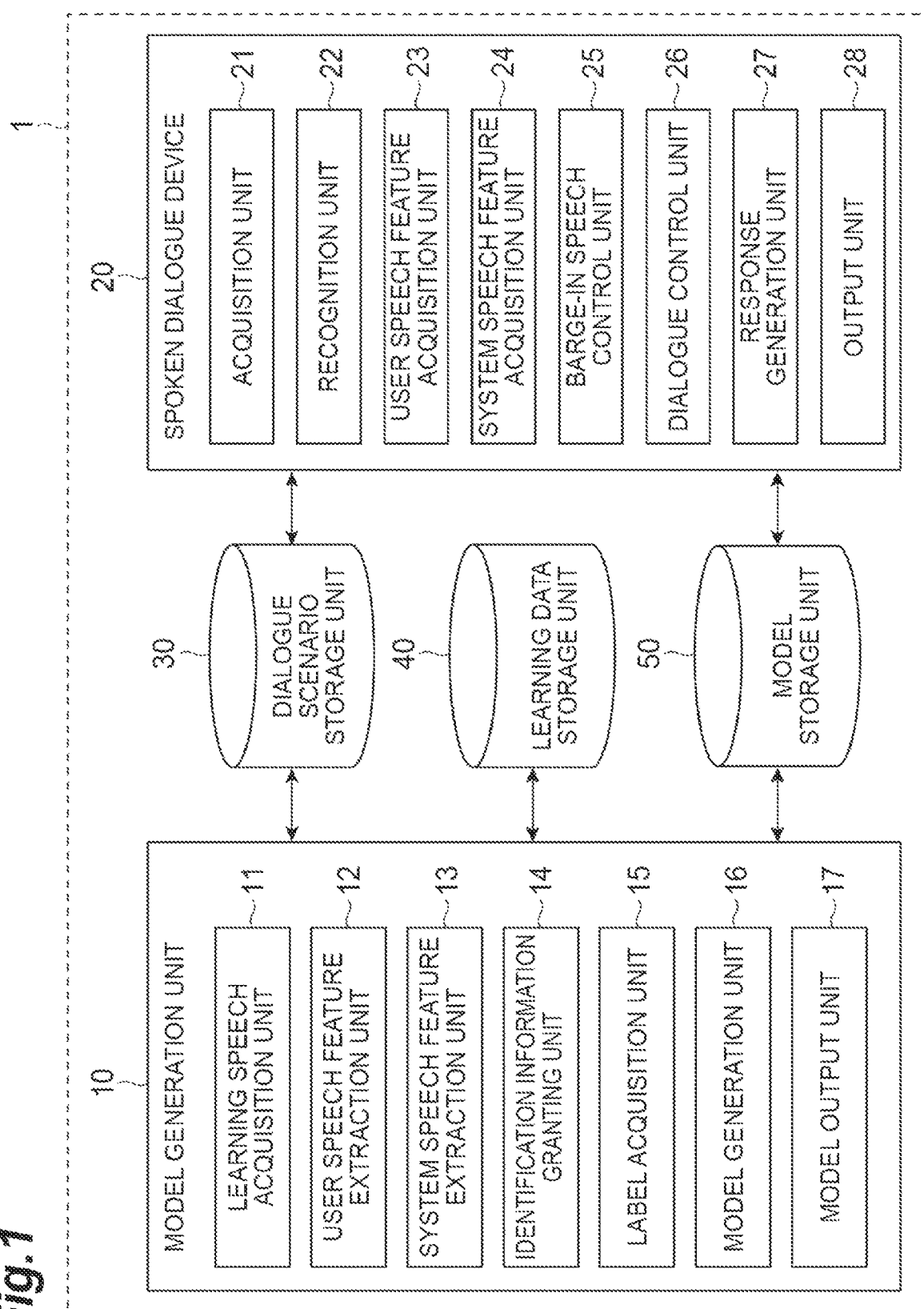
FIG. 1 is a block diagram illustrating a functional configuration of a spoken dialogue system according to an embodiment.

Embodiments of a spoken dialogue system according to the present disclosure will be described with reference to the drawings. If possible, the same reference numerals are given to the same portions and repeated description will be omitted.

FIG. 1 is a diagram illustrating a functional configuration of a spoken dialogue system 1 according to an embodiment. The spoken dialogue system 1 is a system that performs a dialogue with a user by outputting system speech formed by a voice. As illustrated in FIG. 1, the spoken dialogue system 1 includes a model generation device 10 and a spoken dialogue device 20. The spoken dialogue system 1 can include storage units such as a dialogue scenario storage unit 30, a learning data storage unit 40, and a model storage unit 50.

The spoken dialogue system 1 may be configured as a single device, or one device or a plurality of devices among the model generation device 10, the spoken dialogue device 20, the dialogue scenario storage unit 30, the learning data storage unit 40, and the model storage unit 50 may be configured as a single device.

The model generation device 10 is a device that generates a barge-in speech determination model that determines whether to engage barge-in speech in spoken dialogue control. As illustrated in FIG. 1, the model generation device 10 includes a learning speech acquisition unit 11, a user speech feature extraction unit 12, a system speech feature extraction unit 13, an identification information granting unit 14, a label acquisition unit 15, a model generation unit 16, and a model output unit 17 as functional units.

The spoken dialogue device 20 is a device that performs dialogue with a user by outputting system speech. The spoken dialogue device 20 includes an acquisition unit 21, a recognition unit 22, a user speech feature acquisition unit 23, a system speech feature acquisition unit 24, a barge-in speech control unit 25, a dialogue control unit 26, a response generation unit 27, and an output unit 28 as functional units. The functional units will be described in detail later.

The block diagram illustrated in FIG. 1 shows blocks in function units. The functional blocks (constituent units) are realized by a combination of at least one of hardware and software in combination. A method of realizing each functional block is not particularly limited. That is, each functional block may be realized using one physically or logically combined device or may be realized by connecting two or more physically or logically separate devices directly or indirectly (for example, in a wired or wireless manner) and using the plurality of devices. The functional blocks may be realized by combining software with the one device or the plurality of devices.

The functions include determining, deciding, judging, calculating, computing, processing, deriving, investigating, looking up, ascertaining, receiving, transmitting, outputting, accessing, resolving, selecting, choosing, establishing, comparing, assuming, expecting, considering, broadcasting, notifying, communicating, forwarding, configuring, reconfiguring, allocating, mapping, and assigning, but the present disclosure is not limited thereto. For example, a functional block (constituent unit) of causing transmitting to function is called a transmitting unit or a transmitter. As described above, a realization method is not particularly limited.

Figure 2:
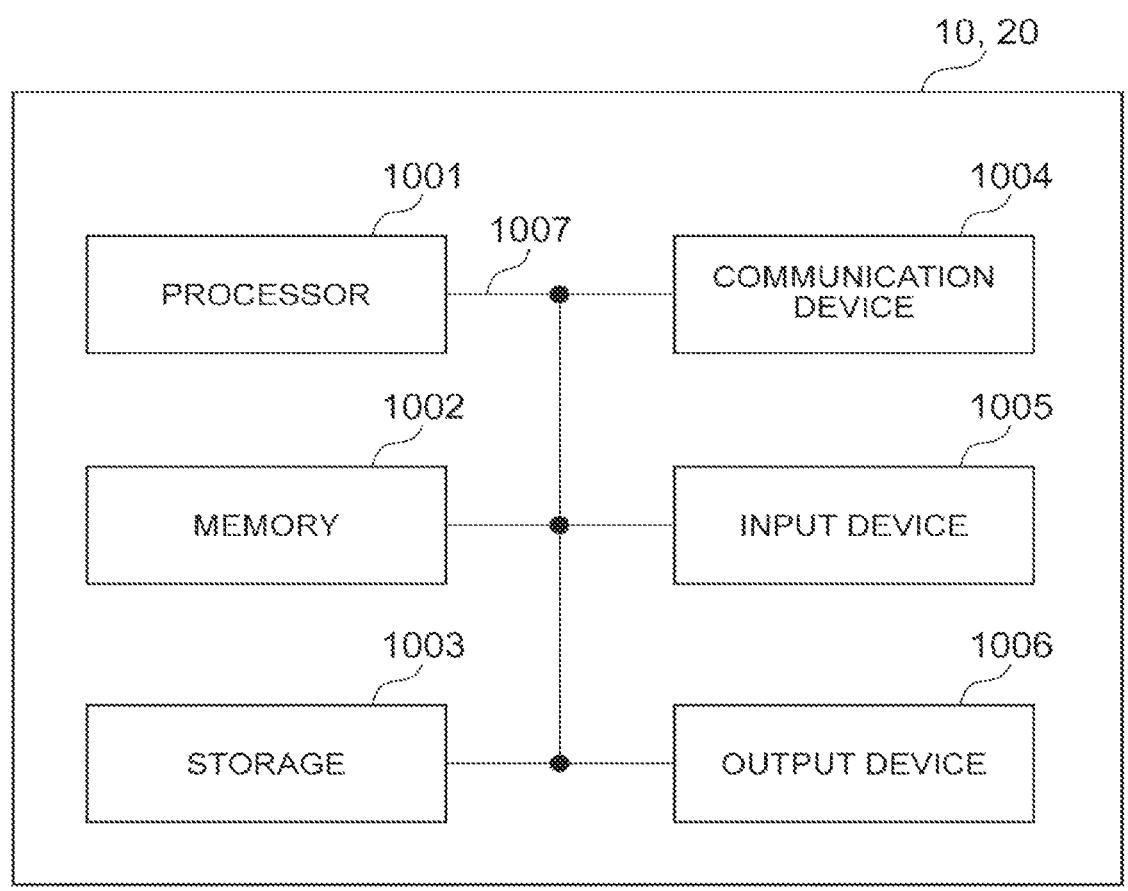
FIG. 2 is a hard block diagram illustrating a model generation device and a spoken dialogue device of the spoken dialogue system.

For example, the model generation device 10 and a spoken dialogue device 20 according to an embodiment of the present disclosure may function as a computer. FIG. 2 is a diagram illustrating an example of a hardware configuration of the model generation device 10 and the spoken dialogue device 20 according to the embodiment of the present disclosure. The model generation device 10 and the spoken dialogue device 20 may be physically configured as a computer device that includes a processor 1001, a memory 1002, a storage 1003, a communication device 1004, an input device 1005, an output device 1006, and a bus 1007.

In the following description, the word "device" can be replaced with "circuit," "device," "unit," or the like. The hardware configuration of the model generation device 10 and a spoken dialogue device 20 may include one device or a plurality of the devices illustrated in the drawing or may be configured not to include some of the devices.

Each function in the model generation device 10 and the spoken dialogue device 20 is realized by reading predetermined software (a program) on hardware such as the processor 1001 and the memory 1002 so that the processor 1001 performs calculation and controls the communication device 1004 performing communication or reading and/or writing of data on the memory 1002 and the storage 1003.

The processor 1001 controls the entire computer, for example, by operating an operating system. The processor 1001 may be configured as a central processing unit (CPU) including an interface with a peripheral device, a control device, a calculation device, and a register. For example, the functional units 11 to 17, 21 to 28, and the like illustrated in FIG. 1 may be realized by the processor 1001.

The processor 1001 reads a program (a program code), a software module, data, and the like from the storage 1003 and/or the communication device 1004 to the memory 1002 to perform various processes. As the program, a program causing a computer to perform at least some of the operations described in the above-described embodiment is used. For example, the functional units 11 to 17 and 21 to 28 in the model generation device 10 and the spoken dialogue device 20 may be realized by a control program that is stored in the memory 1002 and operates in the processor 1001. It is described above that the various processes described above are performed by one processor 1001, but they may be performed simultaneously or sequentially by two or more processors 1001. The processor 1001 may be mounted on one or more chips. The program may be transmitted from a network via an electric communication line.

The memory 1002 is a computer-readable recording medium and may be configured by at least one of, for example, a read-only memory (ROM), an erasable programmable ROM (EPROM), an electrically erasable programmable ROM (EEPROM), a random access memory (RAM), and the like. The memory 1002 may be called a register, a cache, a main memory (a main storage device), or the like. The memory 1002 can store a program (a program code), a software module, and the like that can be executed to implement a model generation method and a spoken dialogue method according to an embodiment of the present disclosure.

The storage 1003 is a computer-readable recording medium and may be configured by at least one of, for example, an optical disc such as a compact disc ROM (CD-ROM), a hard disk drive, a flexible disk, a magneto-optic disc (for example, a compact disc, a digital versatile disc, or a Blu-ray (registered trademark) disc), a smart card, a flash memory (for example, a card, a stick, or a key drive), a floppy (registered trademark) disk, a magnetic strip, and the like. The storage 1003 may also be called an auxiliary storage device. The above-described storage medium may be, for example, a database, a server, or another appropriate medium including the memory 1002 and/or the storage 1003.

The communication device 1004 is hardware (a transceiver device) that performs communication between computers via a wired and/or wireless network and is also, for example, a network device, a network controller, a network card, a communication module, or the like.

The input device 1005 is an input device (for example, a keyboard, a mouse, a microphone, a switch, a button, or a sensor) that receives an input from the outside. The output device 1006 is an output device (for example, a display, a speaker, or an LED lamp) that performs an output to the outside. The input device 1005 and the output device 1006 may be configured to be integrated (for example, a touch panel).

The devices such as the processor 1001 and the memory 1002 are each connected by the bus 1007 to communicate information. The bus 1007 may be configured using a single bus or may be configured using different buses between respective devices.

The model generation device 10 and the spoken dialogue device 20 may be configured to include hardware such as a microprocessor, a digital signal processor (DSP), an application specific integrated circuit (ASIC), a programmable logic device (PLD), and a field programmable gate array (FPGA), and some or all functional blocks may be realized by the hardware. For example, the processor 1001 may be mounted using at least one type of the hardware.

Referring back to FIG. 1, each storage unit included in the spoken dialogue system 1 will be simply described. The dialogue scenario storage unit 30 is a storage unit storing a dialogue scenario that has mutual response rules between user speech and system speech. The dialogue scenario storage unit 30 can include response candidates which are candidates for responses assumed for system speech from users.

The learning data storage unit 40 is a storage unit that stores learning data provided to machine learning to generate a barge-in speech determination model to be described in detail later. The learning data includes user speech and immediately previous system speech which is system speech output immediately before the user speech.

The model storage unit 50 is a storage unit that stores a barge-in speech determination model generated by the model generation device 10. The spoken dialogue device 20 determines whether to engage barge-in speech in spoken dialogue control using the barge-in speech determination model stored in the model storage unit 50.

Next, each functional unit of the model generation device 10 will be described. The learning speech acquisition unit 11 acquires user speech formed by a voice produced by a user and immediately previous system speech which is system speech output immediately before the user speech in a spoken dialogue.

FIG. 3 is a diagram illustrating an example of user speech and immediately previous system speech acquired by the learning speech acquisition unit 11. As illustrated in FIG. 3, the learning speech acquisition unit 11 acquires user speech su. The user speech su is, for example, data of a voice "tokkyu ressha wo riyo shimasu" produced by the user.

The user speech su may be speech of one predetermined section in a series of utterances produced by the user. The speech of the one section is detected by, for example, a known technology for voice section detection (voice activity detection). One section of the speech can be set as, for example, a series of sounded portions partitioned by silent portions (pauses) for a predetermined time or more in a series of speech. Specifically, for example, two sections "SOUDESUNE" and "IITOOMOIMASU" are extracted from the speech "SOUDESUNE . . . (pause) . . . IITOOMOIMASU."

The learning speech acquisition unit 11 acquires immediately previous system speech ss in association with the user speech su. The immediately previous system speech ss is, for example, data of a voice "tokkyu ressha wo riyo shimasuka" produced by the system.

FIG. 4 is a diagram illustrating a second example of user speech and immediately previous system speech acquired by the learning speech acquisition unit 11. As illustrated in FIG. 4, the learning speech acquisition unit 11 acquires user speech su-2(*su*). The user speech su2 is, for example, data of a voice "I take an express train" produced by the user.

The learning speech acquisition unit 11 acquires immediately previous system speech ss-2(*ss*) in association with the user speech su-2. The immediately previous system speech ss-2 is, for example, data of a voice "Do you take an express train?" produced by the system.

Based on the user speech, the user speech feature extraction unit 12 extracts a user speech feature series obtained by dividing the user speech su into user speech elements of a time with a predetermined length and chronologically disposing acoustic features of the user speech elements.

Based on the immediately previous system speech, the system speech feature extraction unit 13 extracts a system speech feature series obtained by dividing the immediately previous system speech ss into system speech elements of a time with a predetermined length and chronologically disposing acoustic features of the system speech elements.

Figure 5:
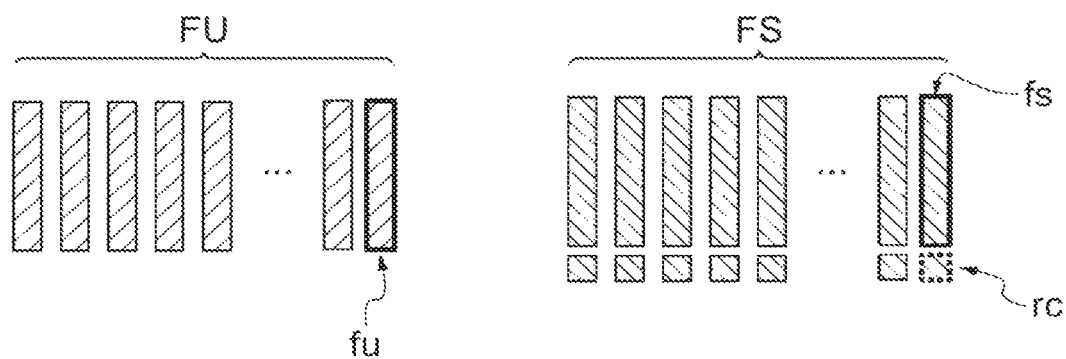
FIG. 5 is a diagram schematically illustrating examples of a user speech feature series and a system speech feature series.

FIG. 5 is a diagram schematically illustrating examples of a user speech feature series and a system speech feature series. In the embodiment, the user speech feature extraction unit 12 divides the user speech su into a plurality of user speech frames fu. The user speech frame fu constitutes an example of a user speech element. The length of one frame can be a time of any predetermined length and may be set to, for example, 10 ms.

Each user speech frame fu includes an acoustic feature. The acoustic feature can include one or more of a sound pitch, a sound strength, a tone, and the like. The acoustic feature may be acquired by, for example, a known technology such as Mel-frequency cepstrum coefficient (MFCC) technology.

As illustrated in FIG. 5, based on the user speech su, the user speech feature extraction unit 12 extracts a user speech feature series FU in which the acoustic features of the user speech frames fu are chronologically disposed.

The system speech feature extraction unit 13 divides the immediately previous system speech ss into the plurality of system speech frames fs. The system speech frame fs constitutes an example of a system speech element. The length of one frame can be a time of any predetermined length and may be set to, for example, 10 ms.

Each system speech frame fs includes an acoustic feature as in the user speech frame fu. The acoustic feature can include one or more of a sound pitch, a sound strength, a tone, and the like.

As illustrated in FIG. 5, based on the immediately previous system speech ss, the system speech feature extraction unit 13 extracts a system speech feature series FS in which the acoustic features of the system speech frames fs are chronologically disposed.

The identification information granting unit 14 grants identification information to the system speech element included in a morpheme which, among morphemes included in the immediately previous system speech, corresponds to a predetermined part of speech and does not correspond to an assumed response candidate to the immediately previous system speech by the user among the plurality of system speech elements included in the system speech feature series. In the embodiment, the identification information granting unit 14 grants a repetitive back-channel code rc to the system speech frame fs. The repetitive back-channel code rc constitutes an example of the identification information. For example, the response candidate is acquired from a dialogue scenario.

When the user speech includes the morpheme which corresponds to the predetermined part of speech (for example, a verb, a noun, or an adjective) among the morphemes included in the immediately previous system speech, the morpheme corresponds to a repetition of the system speech by the user. A morpheme which does not correspond to the response candidate among the morphemes corresponding the repetitions corresponds to a back-channel by the user.

In the embodiment, the identification information granting unit 14 grants the repetitive back-channel code rc to the system speech frame fs included in the morpheme which corresponds to the repetition and the back-channel at the time of production by the user among the morphemes included in the immediately previous system speech.

On the other hand, since the morpheme corresponding to the response candidate corresponds to a response to be engaged in the dialogue control despite the morpheme corresponding to the repetition of the system speech at the time of production by the user among the morphemes included in the system speech, the repetitive back-channel code rc is not granted to this morpheme.

Figure 6:
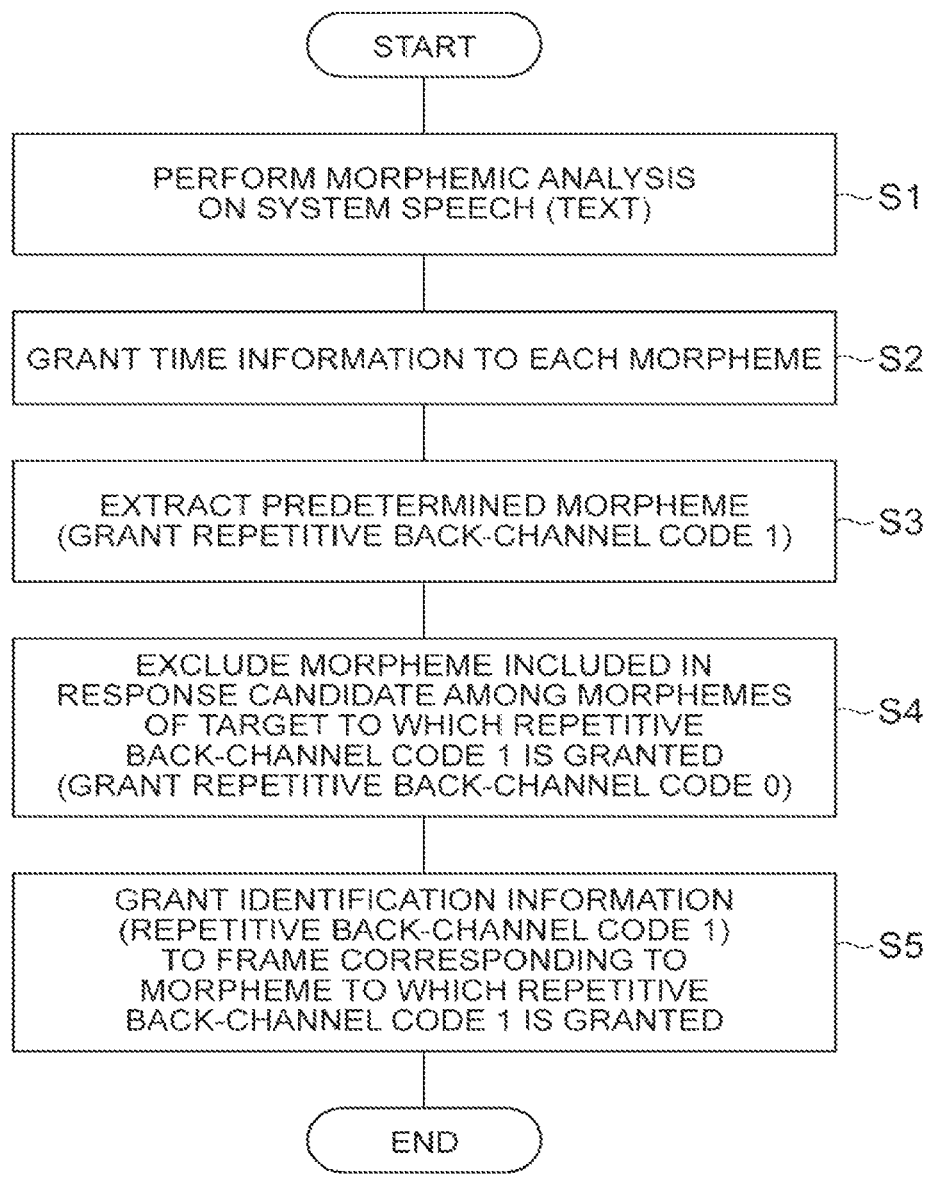
FIG. 6 is a flowchart illustrating content of a process of granting a repetitive back-channel code to a system speech frame.

The granting of the repetitive back-channel code rc to the system speech frame fs will be described with reference to FIGS. 6 to 10. FIG. 6 is a flowchart illustrating content of a process of granting the repetitive back-channel code rc to the system speech frame fs. A timing at which the process of granting the repetitive back-channel code rc illustrated in FIG. 6 is performed is not limited as long as system speech (text) is confirmed or later in the spoken dialogue system 1, and the process of granting the repetitive back-channel code rc is performed before the system speech is output, for example. That is, the process of granting the repetitive back-channel code rc may be performed on the system speech stored in the dialogue scenario storage unit 30 or may be performed on the system speech stored as the learning data in the learning data storage unit 40.

In step S1, the identification information granting unit 14 acquires the system speech (text) and performs morphemic analysis on the acquired system speech. FIG. 7 is a diagram illustrating a process of granting a repetitive back-channel code to a morpheme included in system speech. As illustrated in FIG. 7, the identification information granting unit 14 performs the morphemic analysis on the system speech "tokkyu ressha wo riyo shimasuka" to obtain the morphemes "tokkyu ressha," "wo," "riyo," "shimasu," and "Ka" (see the column of morphemes in FIG. 7).

In step S2, the identification information granting unit 14 grants time information to each morpheme to associate each morpheme with the system speech frame. That is, the identification information granting unit 14 performs forced alignment of the text and a voice of the system speech, acquires a start time and an end time of each morpheme in data of the voice, and associates the start time and the end time with each morpheme. In the example illustrated in FIG. 7, a start time "0.12" and an end time "0.29" are associated with the morpheme of "tokkyu ressha."

In step S3, the identification information granting unit 14 extracts a morpheme of a predetermined part of speech from the morphemes acquired in step S1. Specifically, the identification information granting unit 14 extracts morphemes of a verb, a noun, and an adjective and temporarily grants a repetitive back-channel code "1" for the morphemes to the extracted morphemes. In the example illustrated in FIG. 7, the identification information granting unit 14 grants the repetitive back-channel code "1" to "tokkyu ressha" and "riyo."

In step S4, the identification information granting unit 14 excludes the morpheme included in the response candidate to the system speech by the user among the morphemes to which the repetitive back-channel code "1" is granted. The response candidates of the user are acquired from the dialogue scenario. In the example illustrated in FIG. 7, the identification information granting unit 14 acquires speech content "hai," "iie," "riyo shimasu," and "riyo shimasen" as response candidates of the user to the system speech "tokkyu ressha wo riyo shimasuka." Since the morpheme "riyo" to which the repetitive back-channel code is granted in step S3 is included in the response candidate of the user, the identification information granting unit 14 grants a repetitive back-channel code "0" instead of the repetitive back-channel code "1" temporarily granted to the morpheme "riyo" (see the column of the repetitive back-channel code in FIG. 7).

Figure 8:
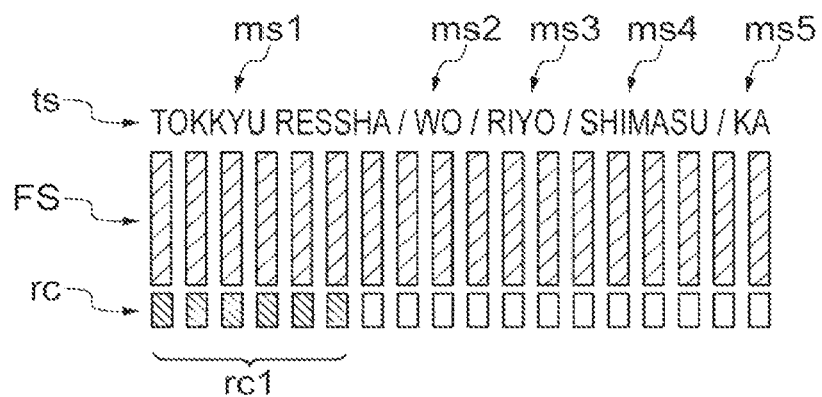
FIG. 8 is a diagram schematically illustrating an example of a system speech frame to which a repetitive back-channel code is attached.

In step S5, the identification information granting unit 14 grants a repetitive back-channel code rc(1) which is identification information to the system speech frame fs corresponding to the morpheme to which the repetitive back-channel code for the morpheme is granted. FIG. 8 is a diagram schematically illustrating an example of a system speech frame to which a repetitive back-channel code is attached. As illustrated in FIG. 8, the identification information granting unit 14 grants the repetitive back-channel code rc(1) to the system speech frame fs corresponding to a morpheme ms1 "tokkyu ressha" among morphemes ms1 to ms5 included in system speech (text) ts. The repetitive back-channel code rc granted in this way is supplied as learning data for learning of a barge-in speech determination model along with the system speech feature series FS.

FIG. 9 is a diagram illustrating a second example of a process of granting a repetitive back-channel code to a morpheme included in system speech. In the example illustrated in FIG. 9, in step S1, the identification information granting unit 14 performs morphemic analysis on the system speech "Do you take an express train" to obtain the morphemes "Do," "you," "take," "an," "express," and "train" (the column of morphemes in FIG. 9).

In step S2, the identification information granting unit 14 grants the time information (the start time and the end time) to each morpheme to associate each morpheme with the system speech frame. In the example illustrated in FIG. 9, the start time "0.29" and the end time "0.32" are associated with the morpheme "you."

In the example illustrated in FIG. 9, in step S3, the identification information granting unit 14 grants the respective back-channel code "1" to "take," "express," and "train" which are the morphemes of a verb, a noun, and an adjective from the morphemes acquired in step S1.

In step S4, the identification information granting unit 14 excludes the morpheme included in the response candidate to the system speech by the user among the morphemes to which the repetitive back-channel code "1" is granted. The response candidate of the user is acquired from the dialogue scenario. In the example illustrated in FIG. 9, the identification information granting unit 14 acquires the speech content "Yes," "No," "I take an express train," and "I do not take an express train" as the response candidates of the user to the system speech "Do you take an express train." Since the morpheme "take" to which the repetitive back-channel code is granted in step S3 is included in the response candidate of the user, the identification information granting unit 14 grants a repetitive back-channel code "0" instead of the repetitive back-channel code "1" temporarily granted to the morpheme "take" (see the column of the repetitive back-channel code in FIG. 9).

Figure 10:
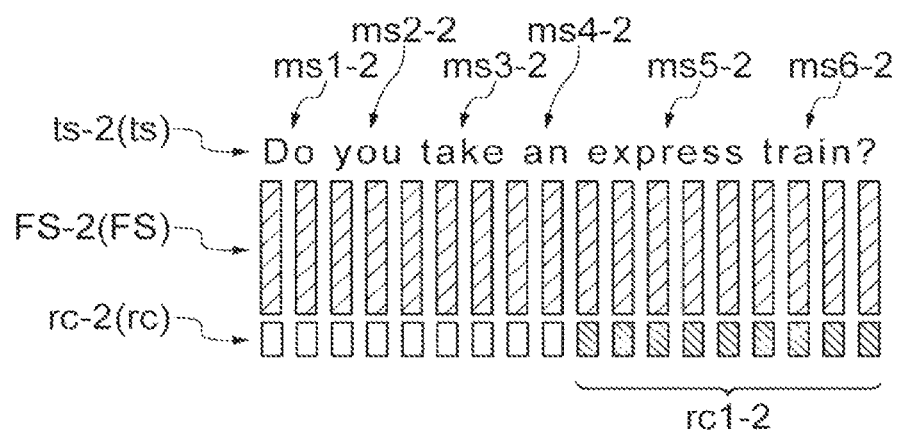
FIG. 10 is a diagram schematically illustrating an example of a system speech frame to which a repetitive back-channel code is attached.

In step S5, the identification information granting unit 14 grants the repetitive back-channel code rc(1) which is identification information to the system speech frame fs corresponding to the morpheme to which the repetitive back-channel code for the morpheme is granted. FIG. 10 is a diagram schematically illustrating a second example of a system speech frame to which a repetitive back-channel code is attached. As illustrated in FIG. 10, the identification information granting unit 14 grants the repetitive back-channel code rc1-2(1) to the system speech frame fs corresponding to morphemes ms5-2 to ms6-2 "express train?" among morphemes ms1-2 to ms6-2 included in system speech (text) ts-2(ts). The repetitive back-channel code rc granted in this way is supplied as learning data for learning of a barge-in speech determination model along with the system speech feature series FS-2(FS).

Of the morphemes included in the system speech, the repetitive back-channel code "1" may be granted to the system speech frame included in the morpheme which corresponds to the repetition and the back-channel at the time of production by the user and the repetitive back-channel code "0" may be granted to the system speech frame included in the morphemes other than the morpheme which corresponds to the repetition and the back-channel at the time of production by the user. Predetermined identification information may be granted to the system speech frame included in the morpheme which corresponds to the repetition and the back-channel at the time of production by the user and the identification information may not be granted to other system speech frames.

Referring back to FIG. 1, the label acquisition unit 15 acquires the correct label associated with the user speech frame fu included in the morpheme that should not be engaged in the dialogue control in the spoken dialogue system among the morphemes included in the user speech su among the plurality of user speech frames fu included in the user speech feature series FU. Specifically, the label acquisition unit 15 acquires the correct label associated with the user speech frame fu included in the morpheme which corresponds to the repetition and the back-channel to the system speech among the morphemes included in the user speech. The association of the correct label with the user speech frame fu may be performed in advance by manpower.

The label acquisition unit 15 may perform the association with the user speech frame fu included in the morpheme which corresponds to the repetition and the back-channel to the system speech through the following process without depending on manpower. Specifically, the label acquisition unit 15 performs morphemic analysis on the user speech su obtained as text information, the immediately previous system speech ss, and each response candidate assumed as a response to the immediately previous system speech ss by the user.

Subsequently, the label acquisition unit 15 extracts the morphemes which, among the morphemes included in the user speech su, correspond to predetermined parts of speech (a noun, a verb, or an adjective) included in the immediately previous system speech ss and are not included in the response candidates as morphemes that are not engaged. For example, when the user speech su "tokkyu ressha wo riyo shimasu," the immediately previous system speech ss "tokkyu ressha wo riyo shimasuka" and the response candidates ("hai," "iie," "riyo shimasu," and "riyo shimasen") are acquired as learning data, the label acquisition unit 15 extracts the morphemes ("tokkyu ressha," "riyo," and "shimasu") as the morphemes of the predetermined parts of speech included in the immediately previous system speech ss from the user speech su. Further, the label acquisition unit 15 extracts "tokkyu ressha," which is a morpheme not included in the response candidate, as the morpheme that is not engaged among the extracted morphemes.

Figure 11:
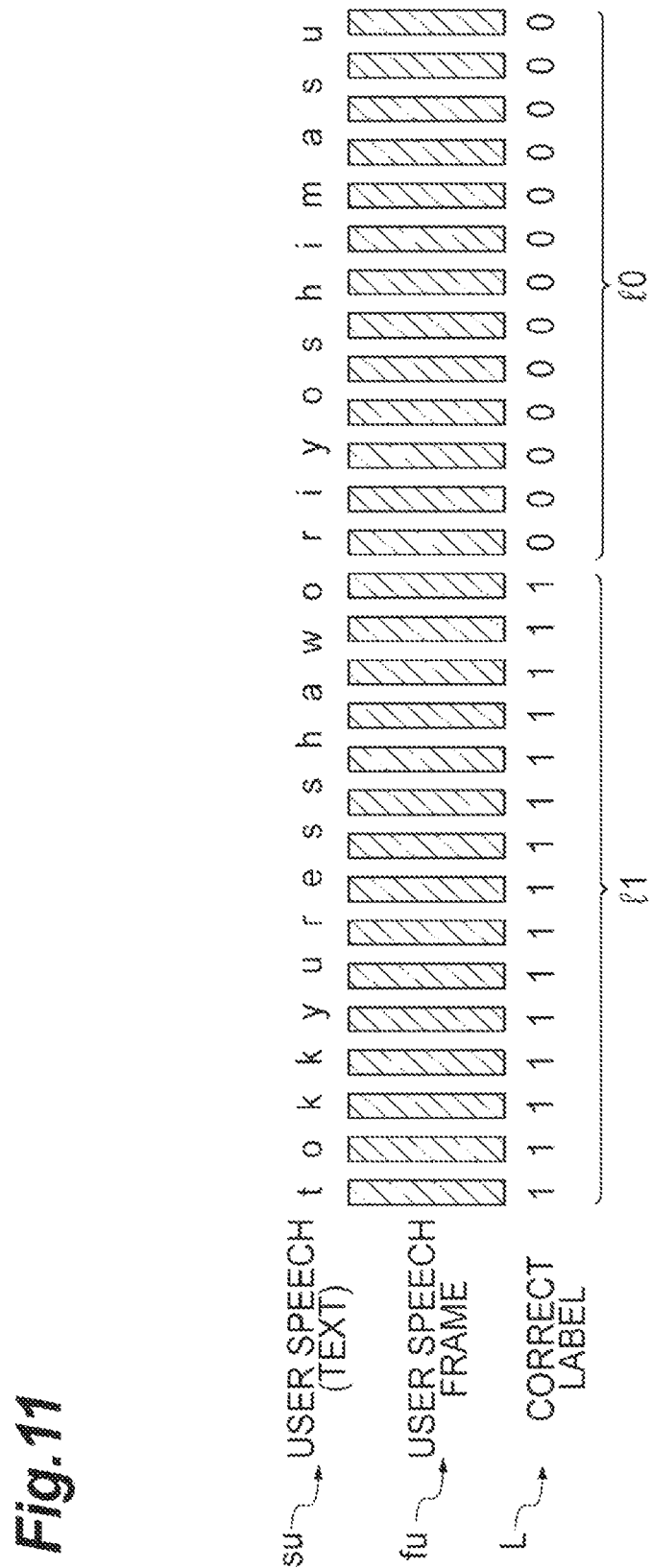
FIG. 11 is a diagram schematically illustrating an example of a user speech frame to which a correct label in learning data is attached.

Then, the label acquisition unit 15 associates the correct label with the user speech frame included in the morpheme that is not engaged. FIG. 11 is a diagram schematically illustrating an example of a user speech frame to which a correct label in learning data is attached. As illustrated in FIG. 11, the label acquisition unit 15 associates a label L with the user speech frame fu.

That is, the label acquisition unit 15 grants time information to each morpheme to associate the morphemes extracted from the user speech su with the user speech frames. Specifically, the label acquisition unit 15 performs forced alignment of the text and a voice of the user speech, acquires a start time and an end time of each morpheme in data of the voice, and associates the start time and the end time with each morpheme. The label acquisition unit 15 extracts the corresponding user speech frame fu based on the start time and the end time of the morpheme "tokkyu ressha" and associates a correct label 11(1) which is a correct label L indicating that the user speech frame should not be engaged. On the other hand, the label acquisition unit 15 associates a correct label 10(0) indicating that the user speech frame is not the user speech frame that should not be engaged with the user speech frame corresponding to the morphemes other than the morpheme "tokkyu ressha."

Figure 12:
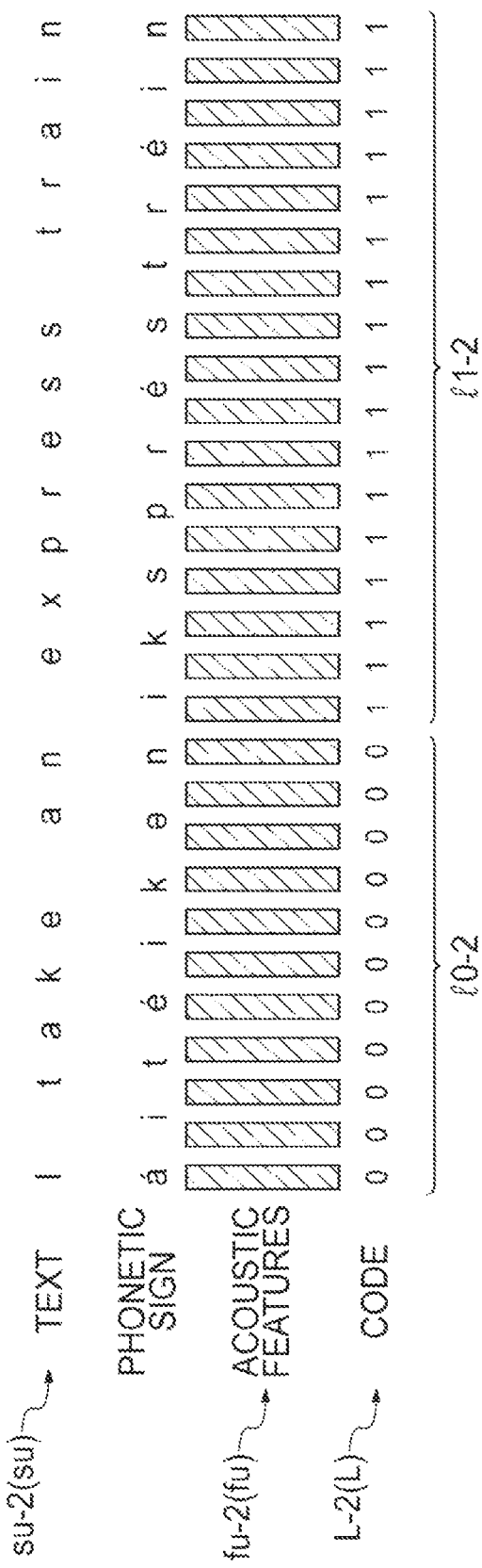
FIG. 12 is a diagram schematically illustrating an example of a user speech frame to which a correct label in learning data is attached.

FIG. 12 is a diagram schematically illustrating a second example of a user speech frame to which a correct label in learning data is attached. As illustrated in FIG. 12, the label acquisition unit 15 associates a label L-2(L) with a user speech frame fu-2(*fu*). That is, the label acquisition unit 15 grants time information to each morpheme to associate the morpheme extracted from user speech su-2(*su*) with the user speech frame. Specifically, the label acquisition unit 15 performs forced alignment of the text and a voice of the user speech, acquires a start time and an end time of each morpheme in data of the voice, and associates the start time and the end time with the morpheme. The label acquisition unit 15 extracts the corresponding user speech frame fu-2 based on the start times and the end times of the morphemes "express" and "train" and associates a correct label 11-2(1) indicating that the user speech frame should not be engaged. On the other hand, the label acquisition unit 15 associates a correct label 10-2(0) indicating that the user speech frame is not a user speech frame that should not be engaged with the user speech frame corresponding to the morphemes other than the morphemes "express" and "train."

Of the morphemes included in the user speech, the correct label "1" may be associated with the user speech frame included in the morpheme that should not be engaged and the correct label "0" may be associated with the user speech frame included in the morphemes other than the morpheme that should not be engaged. Predetermined identification information serving as a correct label may be associated with the user speech frame included in the morpheme that should not be engaged and the predetermined identification information may not be associated with the morpheme included in the morphemes other than the morpheme that should not be engaged.

The model generation unit 16 performs machine learning based on learning data including the user speech feature series FU, the system speech feature series FS including the repetitive back-channel code rc, and the correct label L associated with the user speech frame fu included in the user speech feature series FU to generate a barge-in speech determination model.

The barge-in speech determination model is a model which includes a neural network and is a model that outputs a likelihood that each user speech frame fu should not be engaged in the dialogue control of the spoken dialogue system by setting the user speech feature series based on the user speech and the system speech feature series including the repetitive back-channel code rc based on the immediately previous system speech as inputs, each user speech frame fu being included in the user speech.

Figure 13:
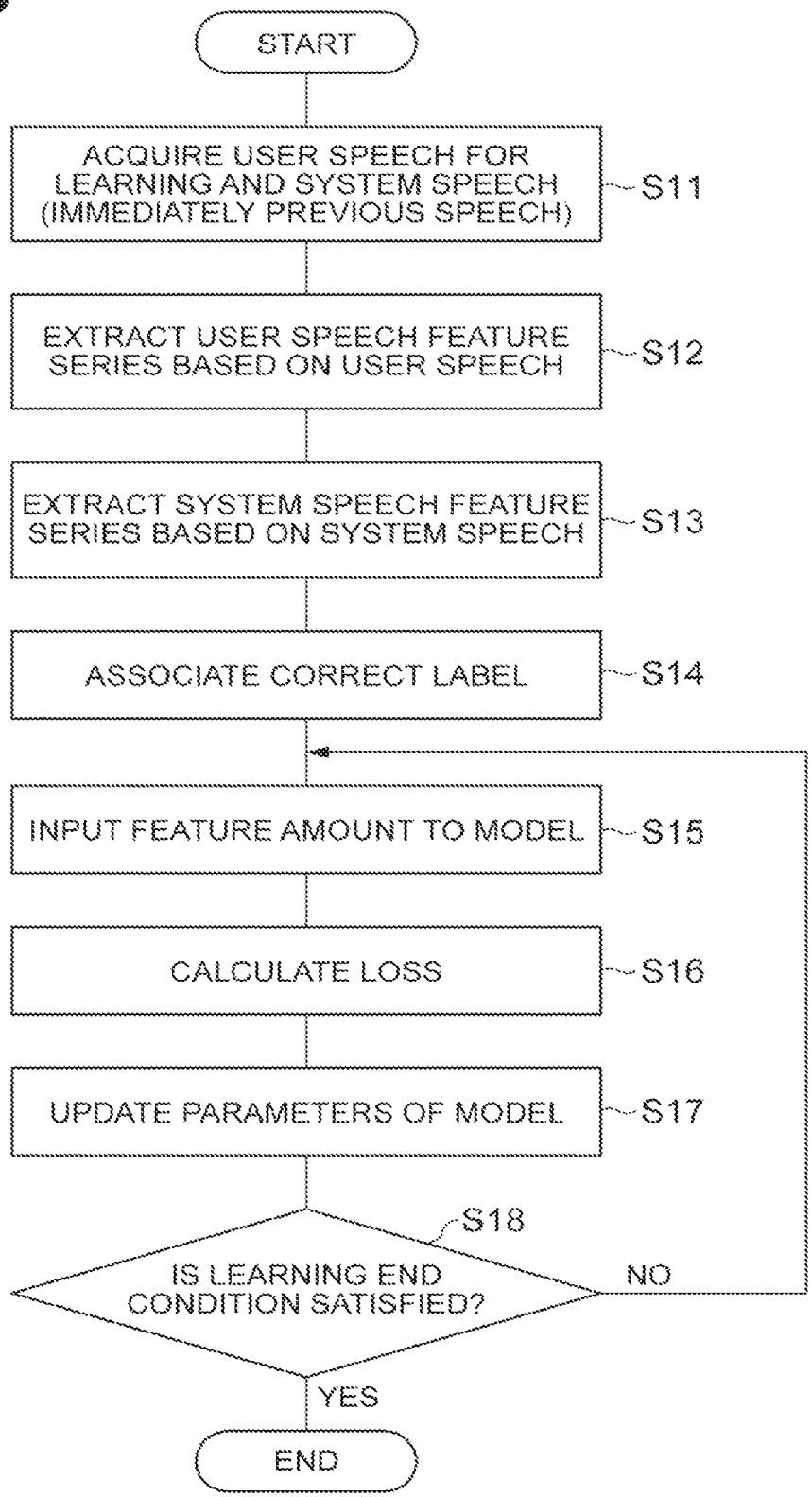
FIG. 13 is a flowchart illustrating content of a process in a learning phase of a barge-in speech determination model.

FIG. 13 is a flowchart illustrating content of a process of learning and generating a barge-in speech determination model in the model generation device 10. In step S11, the learning speech acquisition unit 11 acquires the user speech su for learning and the immediately previous system speech ss which is the system speech output immediately before the user speech su.

In step S12, the user speech feature extraction unit 12 extracts the user speech feature series FU based on the user speech su. In step S13, the system speech feature extraction unit 13 extracts the system speech feature series FS based on the immediately previous system speech ss. The repetitive back-channel code rc for identifying the system speech frame fs included in the morpheme which corresponds to the repetition and the back-channel at the time of production by the user is associated with the system speech frame fs included in the system speech feature series FS.

In step S14, the label acquisition unit 15 associates the correct label L with the user speech frame fu included in the morpheme that should not be engaged in the dialogue control in the spoken dialogue system among the morphemes included in the user speech su.

The process of steps S15 to S17 is a process for machine learning of a model. In step S15, the model generation unit 16 inputs the feature amount of the learning data formed by the user speech feature series FU, the system speech feature series FS including the repetitive back-channel code rc, and the correct label L to the barge-in speech determination model which is a learning and generating target model.

In step S16, the model generation unit 16 calculates a loss based on the correct label L and an output value from the model. In step S17, the model generation unit 16 reversely propagates the loss calculated in step S16 to the neural network and updates a parameter (weight) of the model (neural network).

In step S18, the model generation unit 16 determines whether a predetermined learning end condition is satisfied. Then, the model generation unit 16 repeats the learning process of steps S15 to S17 using the learning data until the learning end condition is satisfied. When the learning ending condition is satisfied, the model generation unit 16 ends the process of learning the barge-in speech determination model.

The model output unit 17 outputs the barge-in speech determination model generated by the model generation unit 16. Specifically, the model output unit 17 stores the generated barge-in speech determination model in, for example, the model storage unit 50.

Next, each functional unit of the spoken dialogue device 20 will be described. The acquisition unit 21 acquires user speech formed by a voice produced by the user. The user speech is, for example, a voice produced by the user in response to system speech produced by the spoken dialogue device 20.

The recognition unit 22 outputs a recognition result obtained by recognizing the user speech acquired by the acquisition unit 21 as text information. The recognition result is supplied for dialogue control in which the dialogue scenario is referred to in the dialogue control unit 26.

The user speech feature acquisition unit 23 acquires the user speech feature series obtained by dividing the user speech acquired by the acquisition unit 21 into user speech frames of a time with a predetermined length and chronologically disposing acoustic features of the user speech elements. The length of the user speech frame is set to the same length as that of the user speech frame extracted by the user speech feature extraction unit 12 of the model generation device 10.

The system speech feature acquisition unit 24 acquires the system speech feature series obtained by dividing the system speech output by the spoken dialogue device 20 into system speech frames of a time with a predetermined length and chronologically disposing acoustic features of the system speech elements.

To determine whether to engage the user speech which is the barge-in speech, the system speech feature acquisition unit 24 acquires the system speech feature series of the immediately previous system speech which is the system speech output by the spoken dialogue device 20 immediately before the user speech acquired by the acquisition unit 21 is produced. In the system speech feature series, the repetitive back-channel code described with reference to FIGS. 6 to 10 is granted to the system speech frame. The repetitive back-channel code serving as the identification information is used to identify a system speech frame included in the morpheme which, among the morphemes included in the immediately previous system speech, corresponds to a morpheme corresponding to a predetermined part of speech (a noun, a verb, or an adjective) and does not correspond to the assumed response candidate to the immediately previous system speech from the user.

The barge-in speech control unit 25 determines whether to engage the barge-in speech which is user speech produced to cut off the system speech being produced. Specifically, when each user speech frame included in the user speech which is the barge-in speech corresponds to the predetermined morpheme (a noun, a verb, or an adjective) included in the immediately previous system speech which is the system speech output by the output unit 28 immediately before the user speech is produced and does not correspond to the morpheme included in the response candidate to the immediately previous system speech in the dialogue scenario, the barge-in speech control unit 25 determines not to engage the user speech frame or the user speech including the user speech frame. In other words, in the user speech including the user speech frame determined not to be engaged, the barge-in speech control unit 25 does not engage at least a portion corresponding to the user speech frame. That is, the barge-in speech control unit 25 may determine that some or all of the user speech included in the user speech frame are not engaged.

The barge-in speech control unit 25 according to the embodiment determines whether to engage the user speech frame included in the barge-in speech using the barge-in speech determination model generated by the model generation device 10. That is, the barge-in speech control unit 25 inputs the user speech feature series acquired by the user speech feature acquisition unit 23 and the system speech feature series (including the repetitive back-channel code) of the immediately previous system speech acquired by the system speech feature acquisition unit 24 to the barge-in speech determination model. Then, the barge-in speech control unit 25 acquires a likelihood of each system speech frame output from the barge-in speech determination model. The likelihood indicates the degree to which engagement should not be performed in the dialogue control.

The barge-in speech determination model which is a model including a learned neural network can be ascertained as a program which is read or referred to by a computer, causes the computer to perform a predetermined process, and causes the computer to realize a predetermined function.

That is, the learned barge-in speech determination model according to the embodiment is used in a computer that includes a CPU and a memory. Specifically, the CPU of the computer operates to perform calculation based on a learned weighted coefficient, a response function, and the like corresponding to each layer of input data (for example, the user speech feature series and the system speech feature series to which the repetitive back-channel code rc is granted) input to an input layer of a neural network in response to an instruction from the learned barge-in speech determination model stored in the memory and output a result (likelihood) from an output layer.

Figure 14:
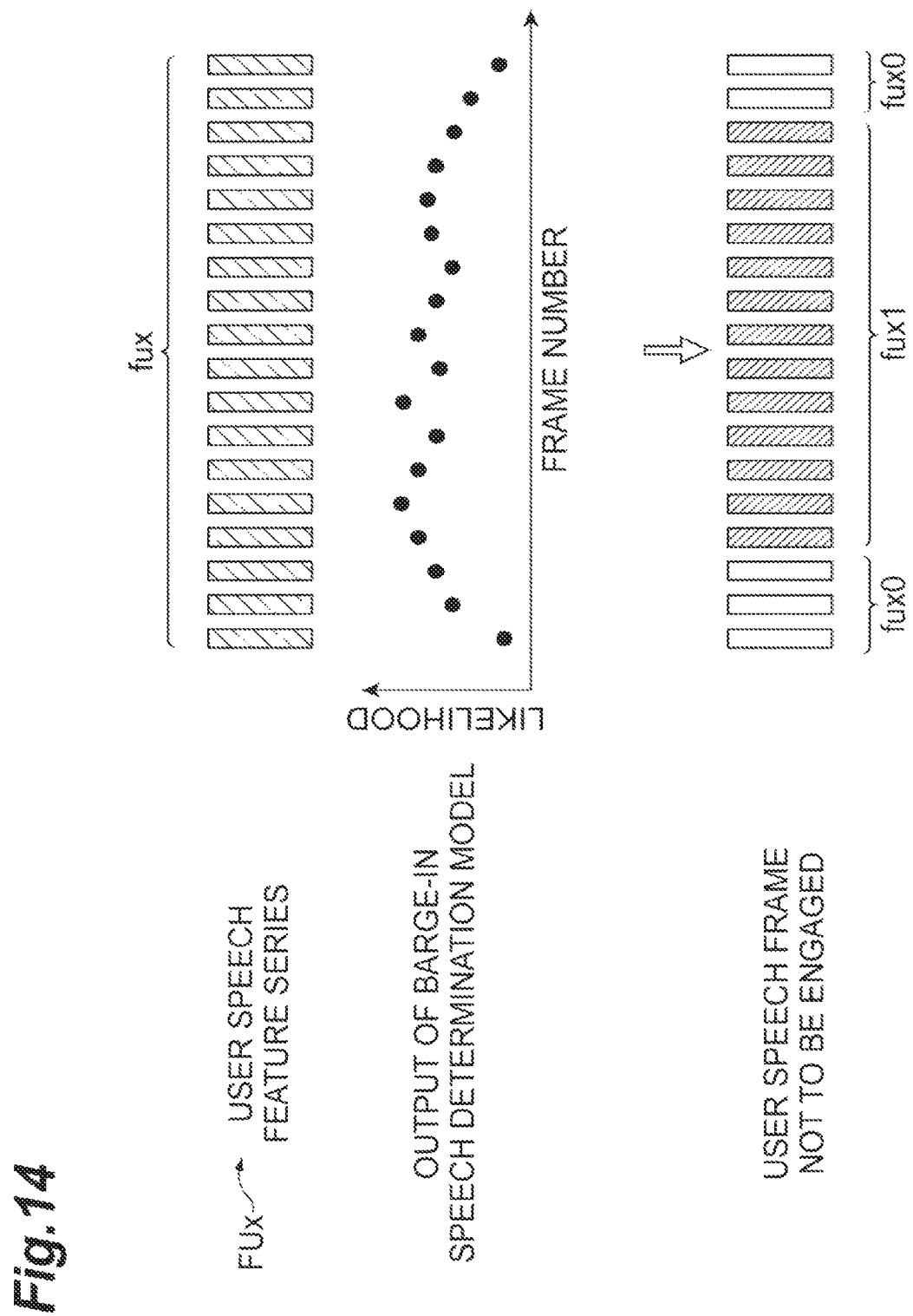
FIG. 14 is a diagram schematically illustrating a likelihood of each user speech frame and an engagement or non-engagement determination result output from the barge-in speech determination model.

FIG. 14 is a diagram schematically illustrating a likelihood of each user speech frame and an engagement or non-engagement determination result output from the barge-in speech determination model. As illustrated in FIG. 14, the barge-in speech control unit 25 inputs the user speech feature series FUx or the like of the user speech which is the barge-in speech to the barge-in speech determination model and acquires the likelihood of each user speech frame fux from an output of the barge-in speech determination model. Then, the barge-in speech control unit 25 determines that a user speech frame fux1 with the likelihood equal to or greater than a predetermined threshold is not engaged in the dialogue control and determines that a user speech frame fux0 with a likelihood less than the predetermined threshold is engaged in the dialogue control.

Figure 15:
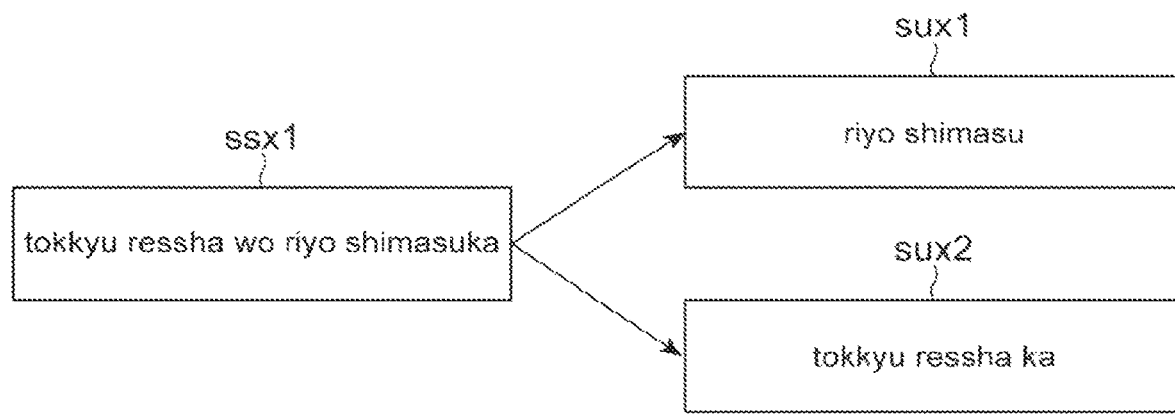
FIG. 15 is a diagram illustrating an example of engagement or non-engagement determination of barge-in speech.

FIG. 15 is a diagram schematically illustrating an example of engagement or non-engagement determination of barge-in speech. When the acquisition unit 21 acquires user speech sux1 "riyo shimasu" which is barge-in speech produced by the user with respect to system speech ss1 "tokkyu ressha wo riyo shimasuka," the morpheme included in the user speech sux1 corresponds to a morpheme of a response candidate to the system speech ssx1. Therefore, the barge-in speech control unit 25 does not determine that any user speech frame included in the user speech sux1 is not engaged.

On the other hand, when the acquisition unit 21 acquires user speech sux2 "tokkyu ressha ka" with respect to "tokkyu ressha wo riyo shimasuka," the morpheme "tokkyu ressha" included in the user speech sux2 corresponds to a predetermined morpheme included in the system speech ssx1 and does not correspond to a response candidate to the system speech ssx1. Therefore, the likelihood output from the barge-in speech determination model is equal to or greater than the predetermined threshold with regard to each user speech frame included in the morpheme "tokkyu ressha" and the barge-in speech control unit 25 determines that the user speech frame included in the morpheme "tokkyu ressha" of the user speech sux2 is not engaged. That is, the barge-in speech determination model determines that the user speech sux2 "tokkyu ressha ka" is a repetition and is a back-channel with respect to the system speech ssx1 "tokkyu ressha wo riyo shimasuka."

Figure 16:
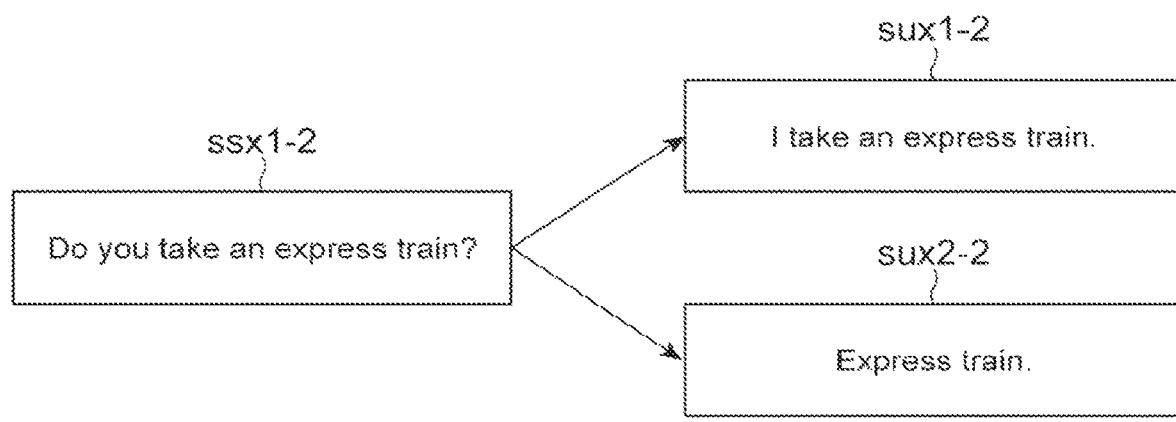
FIG. 16 is a diagram illustrating an example of engagement or non-engagement determination of barge-in speech.

FIG. 16 is a diagram schematically illustrating a second example of engagement or non-engagement determination of barge-in speech. When the acquisition unit 21 acquires the user speech sux1-2 "I take an express train," which is the barge-in speech produced by the user with respect to system speech ssx1-2 "Do you take an express train?," the morpheme included in the user speech sux1-2 corresponds to a morpheme of a response candidate to the system speech ssx1-2. Therefore, the barge-in speech control unit 25 does not determine that any user speech frame included in the user speech sux1-2 is not engaged.

On the other hand, when the acquisition unit 21 acquires user speech sux2-2 "Express train," with respect to the system speech ssx1-2 "Do you take an express train?," the morphemes "express" and "train" included in the user speech sux2-2 correspond to predetermined morphemes included in the system speech ssx1-2 and do not correspond to the morpheme of a response candidate to the system speech ssx1-2. Therefore, the likelihood output from the barge-in speech determination model is equal to or greater than the predetermined threshold with regard to each user speech frame included in the morphemes "express" and "train" and the barge-in speech control unit 25 determines that the user speech frame included in the user speech sux2-2 is not engaged. That is, the barge-in speech determination model determines that the user speech sux2-2 "Express train," is a repetition and is a back-channel with respect to the system speech ssx1-2 "Do you take an express train?"

When each user speech element included in the user speech corresponds to an element of predetermined speech set in advance, the barge-in speech control unit 25 may determine that the user speech element is not engaged in addition to the determination performed using the barge-in speech determination model.

Specifically, when user speech corresponding to a simple back-channel that has no special meaning as a response such as "Yeah" or "hai" is set in advance as predetermined speech and an acoustic feature of the user speech frame included in the user speech acquired by the acquisition unit 21 corresponds to the acoustic feature of speech corresponding to the simple back-channel set as the predetermined speech, the barge-in speech control unit 25 determines that the user speech frame is not engaged in the dialogue control. Thus, it is possible to perform the dialogue control such that the simple back-channel is not engaged.

Referring back to FIG. 1, the dialogue control unit 26 outputs a system response indicating response content with which to respond to the user based on the recognition result corresponding to the user speech other than the barge-in speech determined not to be engaged by the barge-in speech control unit 25 with reference to a dialogue scenario that has a mutual response rule between the user speech and the system speech. Specifically, the dialogue control unit 26 acquires and outputs a system response formed by text to respond to user speech other than the user speech determined not to be engaged with reference to the dialogue scenario stored in the dialogue scenario storage unit 30.

The response generation unit 27 generates system speech formed by voice information based on the system response output by the dialogue control unit 26.

The output unit 28 outputs the system speech generated by the response generation unit 27 as a voice.

Figure 17:
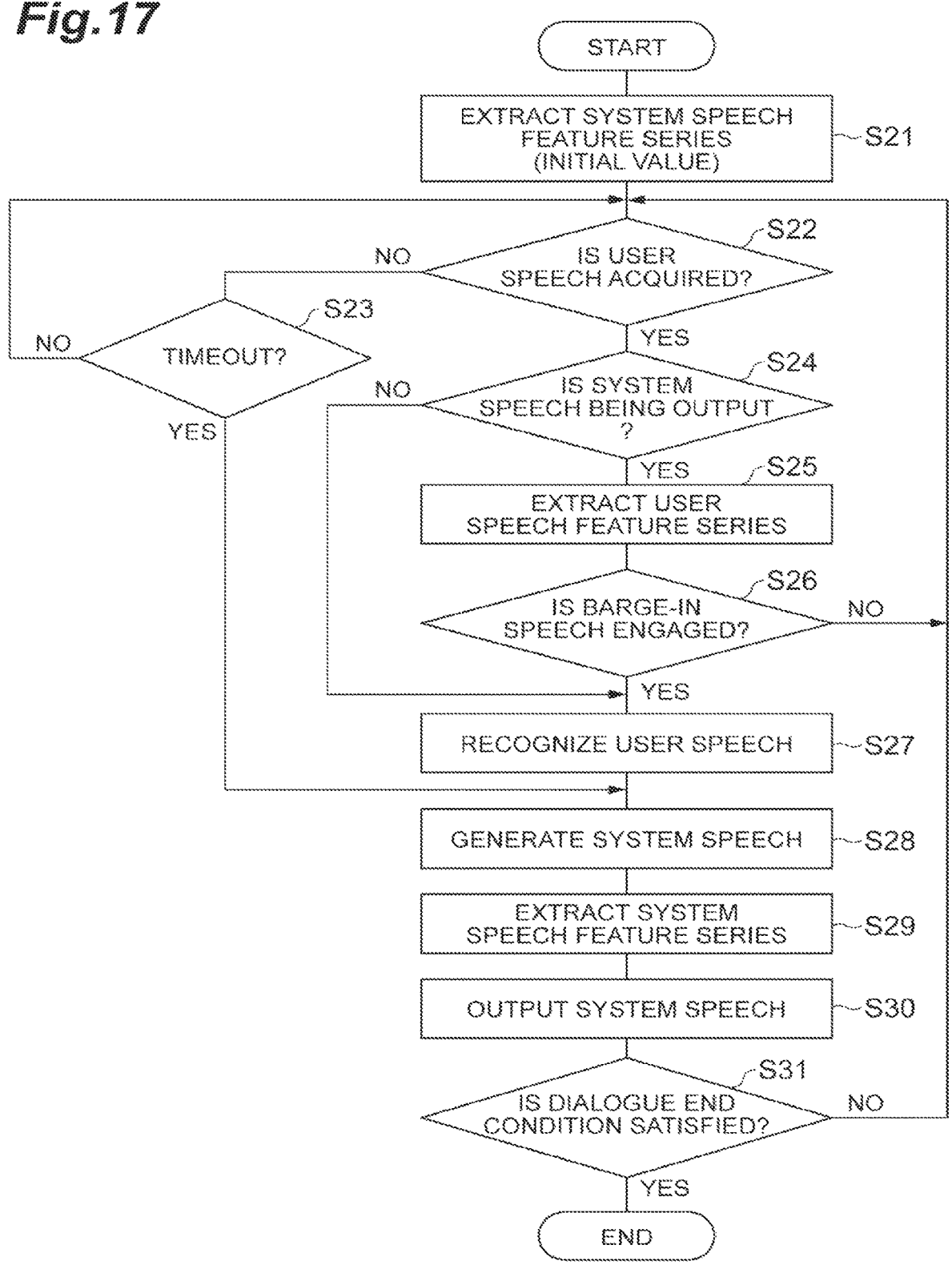
FIG. 17 is a flowchart illustrating content of spoken dialogue processing including an engagement or non-engagement process for barge-in speech in a spoken dialogue device.

Next, a spoken dialogue method in the spoken dialogue device 20 will be described with reference to FIG. 17. FIG. 17 is a flowchart illustrating content of a process in a spoken dialogue method according to the embodiment.

In step S21, the system speech feature acquisition unit 24 acquires a system speech feature series of system speech output by the output unit 28. When the system speech is a dialogue triggered by speech from the spoken dialogue system 1, the system speech may be initial system speech triggered by that speech or may be system speech which is a response to previous user speech while the dialogue continues.

In step S22, the acquisition unit 21 determines whether a voice produced by the user is detected. When the voice of the user is detected, the voice is acquired as user speech. When the user speech is acquired, the process proceeds to step S24. When the user speech is not acquired, the process proceeds to step S23.

In step S23, the acquisition unit 21 determines whether a state in which the user speech is not acquired reaches a timeout of a predetermined time. The acquisition unit 21 attempts to acquire the user speech until the state reaches the timeout. Conversely, when the state reaches the timeout, the process proceeds to step S28.

In step S24, the dialogue control unit 26 determines whether the user speech is detected and acquired in step S22 during output of the system speech. That is, it is detected whether the acquired user speech is the barge-in speech. When it is determined that the user speech is acquired during output of the system speech, the process proceeds to step S25. Conversely, when it is determined that the user speech is not acquired during output of the system speech, the process proceeds to step S27.

In step S25, the user speech feature acquisition unit 23 acquires the user speech feature series of the user speech acquired in step S22.

In step S26, the barge-in speech control unit 25 determines whether to engage the user speech acquired in step S22 and determined to be the barge-in speech in step S24 based on the user speech feature series acquired in step S25. Specifically, the barge-in speech control unit 25 inputs the user speech feature series and the system speech feature series based on the immediately previous system speech to the barge-in speech determination model, acquires a likelihood of each user speech frame, and determines whether to engage each user speech frame based on the acquired likelihood. When the user speech is determined not to be engaged, the process returns to step S22.

In step S27, the recognition unit 22 outputs a recognition result obtained by recognizing the user speech not determined not to be engaged as text information.

In step S28, the dialogue control unit 26 acquires and outputs a system response formed by text to respond to the user speech other than the user speech determined not to be engaged with reference to the dialogue scenario. Then, the response generation unit 27 generates the system speech formed by voice information based on the system response output by the dialogue control unit 26.

In step S29, the system speech feature acquisition unit 24 acquires the system speech feature series of the system speech generated in step S28 and holds the system speech feature series as information regarding immediately previous system speech of subsequent user speech.

In step S30, the output unit 28 outputs the system speech generated by the response generation unit 27 as a voice.

In step S31, the dialogue control unit 26 determines whether a predetermined dialogue end condition of a spoken dialogue with the user is satisfied. When it is determined that the dialogue end condition is not satisfied, the process returns to step S22.

Figure 18:
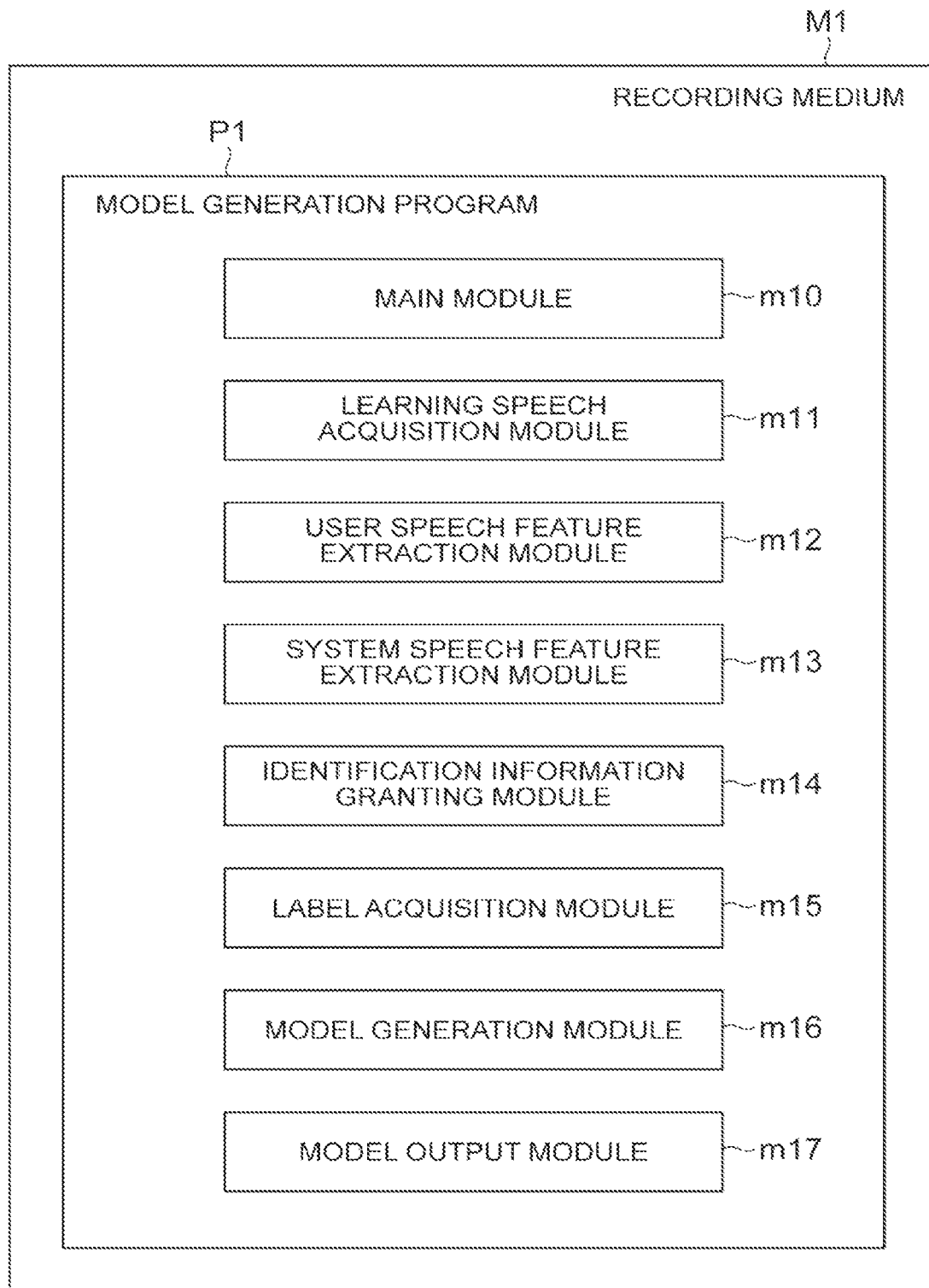
FIG. 18 is a diagram illustrating a configuration of a model generation program.

Next, a model generation program causing a computer to function as the model generation device 10 according to the embodiment will be described. FIG. 18 is a diagram illustrating a configuration of a model generation program P1.

The model generation program P1 includes a main module m10 that performs general control of the model generation process in the model generation device 10, a learning speech acquisition module m11, a user speech feature extraction module m12, a system speech feature extraction module m13, an identification information granting module m14, a label acquisition module m15, a model generation module m16, and a model output module m17. The modules m11 to m17 realize functions of the learning speech acquisition unit 11, the user speech feature extraction unit 12, the system speech feature extraction unit 13, the identification information granting unit 14, the label acquisition unit 15, the model generation unit 16, and the model output unit 17 of the model generation device 10. The model generation program Pt may be configured to be transmitted via a transmission medium such as a communication line or may be configured to be stored in a recording medium M1, as illustrated in FIG. 18.

Figure 19:
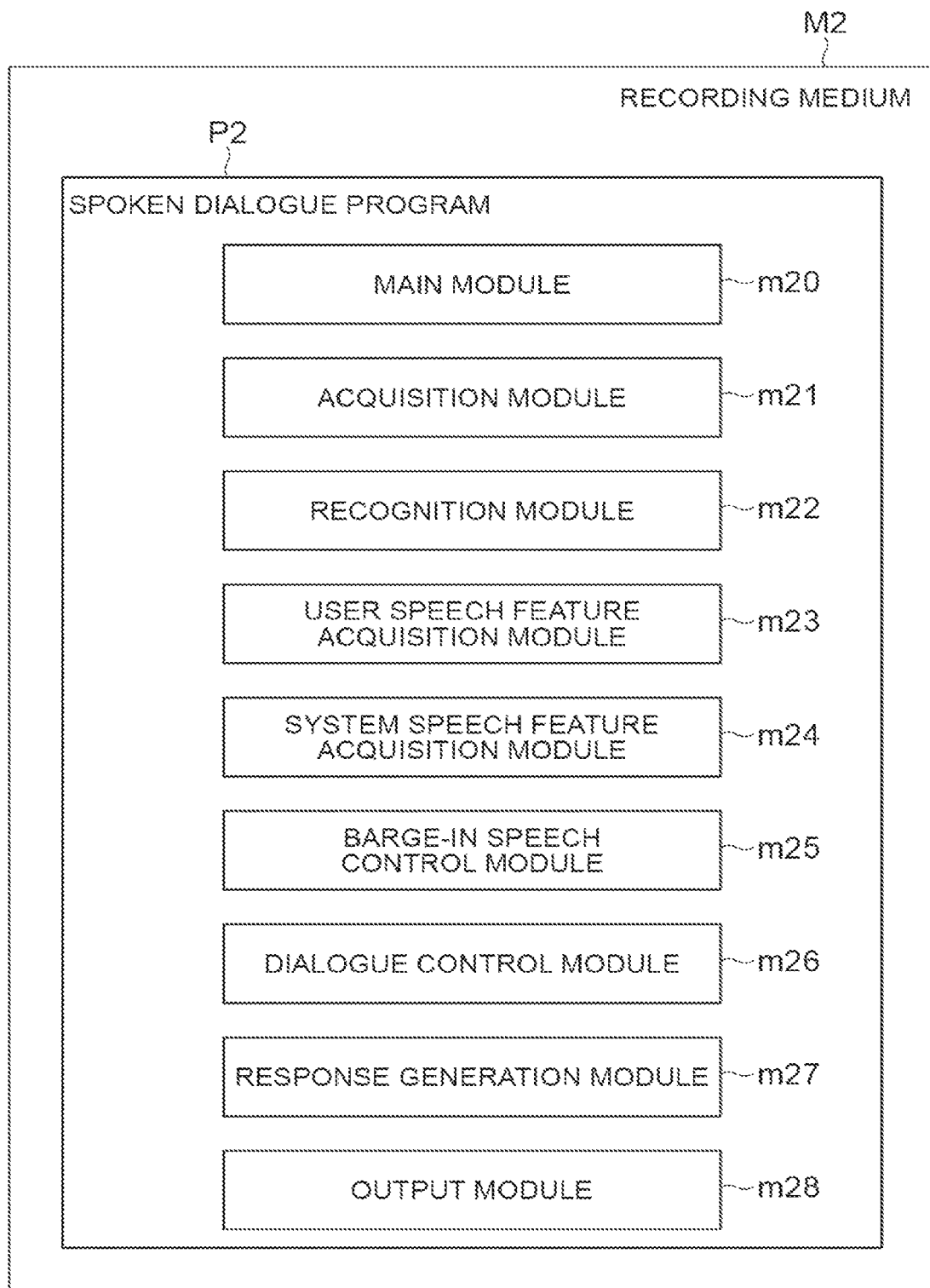
FIG. 19 is a diagram illustrating a configuration of a spoken dialogue program.

FIG. 19 is a diagram illustrating a configuration of a spoken dialogue program causing a computer to function as the spoken dialogue device 20 according to the embodiment.

The spoken dialogue program P2 includes a main module m20 that generally controls the spoken dialogue process in the spoken dialogue device 20, an acquisition module m21, a recognition module m22, a user speech feature acquisition module m23, a system speech feature acquisition module m24, a barge-in speech control module m25, a dialogue control module m26, a response generation module m27, and an output module m28. The modules m21 to m28 realize functions of the acquisition unit 21, the recognition unit 22, the user speech feature acquisition unit 23, the system speech feature acquisition unit 24, the barge-in speech control unit 25, the dialogue control unit 26, the response generation unit 27, and the output unit 28 of the spoken dialogue device 20. The spoken dialogue program P2 may be configured to be transmitted via a transmission medium such as a communication line or may be configured to be stored in a recording medium M2, as illustrated in FIG. 19.

In the spoken dialogue device 20, the spoken dialogue method, and the spoken dialogue program P2 according to the above-described embodiment, when a user speech element included in a user speech corresponds to a predetermined morpheme included in an immediately previous system speech, there is a high possibility of the user speech elements corresponding to repetition elements of a system speech. When the user speech elements are repetitions of some of the immediately previous system speeches and correspond to elements of a response candidate to the immediately previous system speech, the user speech corresponds to elements to be engaged in dialogue control. In consideration of this, when the user speech elements correspond to predetermined morphemes included in the immediately previous system speech and do not correspond to elements of a response candidate to the immediately previous system speech, it is determined that the user speech elements are not engaged in the dialogue control. Accordingly, an erroneous operation in the spoken dialogue system is prevented and convenience for a user is improved.

In a spoken dialogue system according to another embodiment, the user speech element may be an element obtained by chronologically dividing a user speech into times of a predetermined length and each user speech element may include an acoustic feature.

According to the above embodiment, since the user speech includes the chronologically user speech elements which each include the acoustic feature and whether to engage each user speech element is determined, it is not necessary to recognize the user speech as text information to determine engagement or non-engagement. Accordingly, since it can be determined whether to engage the barge-in speech without waiting for the end of one determination target section of the user speech, the dialogue control process is performed quickly.

A spoken dialogue system according to still another embodiment may further include a user speech feature acquisition unit configured to acquire a user speech feature series obtained by dividing the user speech into user speech elements of a time with a predetermined length and chronologically disposing acoustic features of the user speech elements based on the user speech; and a system speech feature acquisition unit configured to acquire a system speech feature series in which acoustic features of the system speech elements obtained by dividing the immediately previous system speech into times with a predetermined length are chronologically disposed, the system speech feature series including identification information attached to a system speech element included in a morpheme which, among morphemes included in the immediately previous system speech, corresponds to a predetermined part of speech and does not correspond to a response candidate acquired from the dialogue scenario and assumed to the immediately previous system speech by the user among the plurality of system speech elements. The barge-in speech control unit may determine whether to engage each user speech element using a barge-in speech determination model in which the user speech feature series, the system speech feature series, and the identification information are set as inputs and a likelihood of each speech element not engaged in dialogue control of the spoken dialogue system is set as an output, each speech element being included in the user speech.

According to the above embodiment, since the barge-in speech determination model in which the user speech feature series and the system speech feature series including the identification information are set as inputs and the likelihood of each speech element not to be engaged is output for each user speech element is used, whether to engage each user speech element included in the user speech can be determined with high precision.

In the spoken dialogue system according to still another embodiment, the barge-in speech determination model may be configured by machine learning based on learning data, the learning data may include feature information including the user speech feature series based on the user speech, the system speech feature series based on the immediately previous system speech output immediately before the user speech, and the identification information granted to a plurality of system speech elements included in the system speech feature series as input values and include, as an output value, a correct label associated with the user speech element included in a morpheme not to be engaged in the dialog control of the spoken dialogue system among morphemes included in the user speech.

According to the above embodiment, the barge-in speech determination model which is generated by machine learning based on learning data and feature amounts including includes the user speech feature series, the system speech feature series, and the identification information granted to a plurality of system speech elements as the input values and including, as an output value, the correct label associated with the user speech element not to be engaged is used to determine whether to engage the user speech element. Thus, it is possible to determine whether to engage each user speech element included in the user speech with high precision.

In the spoken dialogue system according to still another embodiment, the barge-in speech control unit may determine that the user speech element is not engaged when each user speech element corresponds to an element of a predetermined speech set in advance.

According to the above embodiment, by setting a speech corresponding to a simple back-channel that has no special meaning in a dialogue as a predetermined speech in advance, it is possible to perform control such that the simple back-channel included in the barge-in speech is not engaged.

According to one embodiment of the present invention, a model generation device generates a barge-in speech determination model determining to engage a barge-in speech which is a user speech produced to cut off ongoing output of a system speech in the spoken dialogue system performing a dialogue with a user by outputting the system speech formed by a voice with respect to the user speech formed by the voice produced by the user. The model generation device includes: a learning speech acquisition unit configured to acquire the user speech and an immediately previous system speech which is a system speech output immediately before the user speech; a user speech feature extraction unit configured to extract a user speech feature series obtained by dividing the user speech into user speech elements of a time with a predetermined length and chronologically disposing acoustic features of the user speech elements based on the user speech; a system speech feature extraction unit configured to extract a system speech feature series obtained by dividing the immediately previous system speech into system speech elements of a time with a predetermined length and chronologically disposing acoustic features of the system speech elements based on the immediately previous system speech; an identification information granting unit configured to grant identification information to the system speech element included in a morpheme which, among morphemes included in the immediately previous system speech, corresponds to a predetermined part of speech and does not correspond to a response candidate acquired from a dialogue scenario that has a mutual response rule between the user speech and the system speech and assumed to the immediately previous system speech by the user among the plurality of system speech elements included in the system speech feature series; a label acquisition unit configured to acquire a correct label associated with the user speech element included in a morpheme not to be engaged in the dialog control of the spoken dialogue system among morphemes included in the user speech; a model generation unit configured to perform machine learning based on learning data including the user speech feature series, the system speech feature series including the identification information, and the correct label and generate a barge-in speech determination model in which the user speech feature series based on the user speech and the system speech feature series including the identification information based on the immediately previous system speech are set as inputs and a likelihood of each speech element not to be engaged in the dialogue control of the spoken dialogue system is set as an output each speech element being included in the user speech; and a model output unit configured to output the barge-in speech determination model generated by the model generation unit.

According to the above embodiment, the barge-in speech determination model is generated by machine learning in which the user speech feature series, the system speech feature series, and the identification information granted to system speech elements are included as the input values and are based on learning data including the correct label associated with the user speech element not to be engaged as an output value. Thus, it is possible to obtain a model appropriate to determine whether to engage the user speech element.

In the model generation device according to one embodiment, the label acquisition unit may perform morphemic analysis on the user speech, the immediately previous system speech, and each response candidate assumed as a response to the immediately previous system speech by the user, extract an unengaged morpheme which is a morpheme included in the immediately previous system speech and not included in the response candidate among morphemes included in the user speech, and associate the correct label with the user speech element included in the unengaged morpheme.

According to the above embodiment, it is possible to easily generate the correct label associated with the user speech element included in the morpheme not to be engaged in the dialogue control among the morphemes included in the user speech. Thus, a load for generating the learning data used to learn the barge-in speech determination model is reduced.

According to one embodiment of the present invention, a barge-in speech determination model is a barge-in speech determination model learned to cause a computer to function so that it is determined in a spoken dialogue system whether to engage a barge-in speech which is a user speech produced to cut off ongoing output of a system speech in the spoken dialogue system that performs a dialogue with a user by outputting the system speech formed by a voice in response to the user speech formed by a voice produced by the user. The barge-in speech determination model is configured by machine learning based on learning data. The learning data includes, as input values, feature information including: a user speech feature series in which acoustic features of user speech elements obtained by dividing the user speed into times with a predetermined length are chronologically disposed; a system speech feature series in which acoustic features of system speech elements obtained by dividing an immediately previous system speech which is a system speech output immediately before the user speech into times with a predetermined length are chronologically disposed; and identification information granted to a system speech element included in a morpheme which, among morphemes included in the immediately previous system speech, corresponds to a predetermined part of speech and does not correspond to a response candidate acquired from a dialogue scenario that has a mutual response rule between the user speech and the system speech and assumed to the immediately previous system speech by the user, among a plurality of system speech elements included in the system speech feature series. The learning data includes, as an output value, a correct label associated with the user speech element included in a morpheme not to be engaged in dialogue control of the spoken dialogue system among morphemes included in the user speech. The user speech feature series based on the user speech and the system speech feature series including the identification information based on the immediately previous system speech are set as inputs for the barge-in speech determination model and a likelihood of each user speech element not to be engaged in the dialogue control of the spoken dialogue system is set as an output for the barge-in speech determination model, each speech element being included in the user speech.

According to the above embodiment, since the barge-in speech determination model in which the user speech feature series and the system speech feature series including the identification information are set as inputs and the likelihood of each speech element being unengaged is output for each user speech element is configured by machine learning, it is possible to obtain the model which can determine whether to engage each user speech element included in the user speech with high precision.

According to one embodiment, a spoken dialogue program causes a computer to function as a spoken dialogue system that performs a dialogue with a user by outputting a system speech formed by a voice and realize: an acquisition function of acquire a user speech formed by a voice produced by the user; a recognition function of outputting a recognition result obtained by recognizing the user speech acquired by the acquisition function as text information; a barge-in speech control function of determining whether to engage a barge-in speech which is the user speech produced to cut off ongoing output of the system speech; a dialogue control function of outputting a system response representing response content to be responded for the user based on the recognition result corresponding to the user speech other than the barge-in speech determined not to be engaged by the barge-in speech control function with reference to a dialogue scenario that has a mutual response rule between the user speech and the system speech; a response generation function of generating the system speech based on the system response output by the dialogue control function; and an output function configured to output the system speech. The user speech is formed by one or more chronological user speech elements. The dialogue scenario includes a response candidate which is a response assumed to the system speech from the user. When each user speech element corresponds to a predetermined morpheme included in an immediately previous system speech which is the system speech output by the output function immediately before the user speech is produced by the user and does not correspond to an element of the response candidate to the immediately previous system speech in the dialogue scenario, the barge-in speech control function determines not to engage the user speech element or the user speech including the user speech element.

In the program according to the above embodiment, when the user speech element corresponds to the predetermined morpheme included in the immediately previous system speech and does not correspond to the element of the response candidate of the immediately previous system speech, the user speech element is determined not to be engaged in the dialogue control. Accordingly, an erroneous operation in the spoken dialogue system is prevented and convenience for the user is improved.

While the embodiments of the invention have been described above in detail, it is apparent to those skilled in the art that the invention is not limited to the embodiments described in this specification. The embodiment can be modified and altered in various forms without departing from the gist and scope of the invention defined by description in the appended claims. Accordingly, description in this specification is for exemplary explanation, and does not have any restrictive meaning for the embodiment.

The aspects/embodiments described in this specification may be applied to systems employing Long Term Evolution (LTE), LTE-Advanced (LTE-A), SUPER 3G, IMT-Advanced, 4G, 5G, future radio access (FRA), W-CDMA (registered trademark), GSM (registered trademark), CDMA2000, ultra mobile broadband (UMB), IEEE 802.11 (Wi-Fi), IEEE 802.16 (WiMAX), IEEE 802.20, ultra-wideband (UWB), Bluetooth (registered trademark), or other appropriate systems and/or next-generation systems to which these systems are extended on the basis thereof.

The order of the processing sequences, the sequences, the flowcharts, and the like of the aspects/embodiments described above in this specification may be changed as long as it does not cause any inconsistencies. For example, in the methods described in this specification, various steps are presented as elements in an exemplary order but the methods are not limited to the presented order.

The input or output information or the like may be stored in a specific place (for example, a memory) or may be managed in a management table. The input or output information or the like may be overwritten, updated, or added. The output information or the like may be deleted. The input information or the like may be transmitted to another device.

Determination may be performed using a value (0 or 1) which is expressed in one bit, may be performed using a Boolean value (true or false), or may be performed by comparison of numerical values (for example, comparison with a predetermined value).

The aspects/embodiments described in this specification may be used alone, may be used in combination, or may be switched during implementation thereof. Transmission of predetermined information (for example, transmission of "X") is not limited to explicit transmission, and may be performed by implicit transmission (for example, the predetermined information is not transmitted).

While the present disclosure has been described in detail, it is apparent to those skilled in the art that the present disclosure is not limited to the embodiments described in the present disclosure. The present disclosure can be modified and altered in various forms without departing from the gist and scope of the invention defined by description in the appended claims. Accordingly, description in the present disclosure is for exemplary explanation, and does not have any restrictive meaning for the present disclosure.

Regardless of whether it is called software, firmware, middleware, microcode, hardware description language, or another name, software can be widely interpreted to refer to commands, a command set, codes, code segments, program codes, a program, a sub program, a software module, an application, a software application, a software package, a routine, a sub routine, an object, an executable file, an execution thread, an order, a function, or the like.

Software, commands, and the like may be transmitted and received via a transmission medium. For example, when software is transmitted from a web site, a server, or another remote source using wired technology such as a coaxial cable, an optical fiber cable, a twisted-pair wire, or a digital subscriber line (DSL) and/or wireless technology such as infrared rays, radio waves, or microwaves, the wired technology and/or the wireless technology are included in the definition of the transmission medium.

Information, signals, and the like described in the present disclosure may be expressed using one of various different techniques. For example, data, an instruction, a command, information, a signal, a bit, a symbol, and a chip which can be mentioned in the overall description may be expressed by a voltage, a current, an electromagnetic wave, a magnetic field or magnetic particles, a photo field or photons, or an arbitrary combination thereof.

The terms described in the present disclosure and/or the terms required for understanding this specification may be substituted by terms having the same or similar meanings.

The term, "system" and "network" are used synonymously in this specification.

Information, parameters, and the like described in this specification may be expressed by absolute values, may be expressed by values relative to a predetermined value, or may be expressed by other corresponding information.

Terms such as "determining" used in the present disclosure may include various operations of various types. The "determining," for example, may include a case in which judging, calculating, computing, processing, deriving, investigating, looking up, searching, or inquiring (for example, looking up a table, a database, or any other data structure), or ascertaining is regarded as "determining." In addition, "determining" may include a case in which receiving (for example, receiving information), transmitting (for example, transmitting information), inputting, outputting, or accessing (for example, accessing data in a memory) is regarded as "determining." Furthermore, "determining" may include a case in which resolving, selecting, choosing, establishing, comparing, or the like is regarded as "determining." In other words, "determining" includes a case in which a certain operation is regarded as "determining."

Further, "determining" may be replacing with reading such as "assuming," "expecting," or "considering."

Description of "on the basis of" used in the present disclosure does not mean "only on the basis of" unless otherwise mentioned. In other words, description of "on the basis of" means both "only on the basis of" and "at least on the basis of."

Any reference to elements having names such as "first" and "second" which are used in this specification does not generally limit amounts or an order of the elements. The terms can be conveniently used as methods for distinguishing two or more elements in this specification. Accordingly, reference to first and second elements does not mean that only two elements are employed or that the first element has to precede the second element in any form.

When the terms "include," "including," and modifications thereof are used in this specification or the appended claims, the terms are intended to have a comprehensive meaning similar to the term "comprising." The term "or" which is used in this specification or the claims is not intended to mean an exclusive logical sum.

In this specification, a singular term includes plural forms unless only one is mentioned to be apparent in context or technically.

Through the present disclosure, a plurality is assumed to be included unless a single is clearly indicated from a context.

REFERENCE SIGNS LIST

1: Spoken dialogue system
10: Model generation device
11: Learning speech acquisition unit
12: User speech feature extraction unit
13: System speech feature extraction unit
14: Identification information granting unit
15: Label acquisition unit
16: Model generation unit
17: Model output unit
20: Spoken dialogue device
21: Acquisition unit
22: Recognition unit
23: User speech feature acquisition unit
24: System speech feature acquisition unit
25: Barge-in speech control unit
26: Dialogue control unit
27: Response generation unit
28: Output unit
30: Dialogue scenario storage unit
40: Learning data storage unit
50: Model storage unit
M1, M2: Recording medium
m11: Learning speech acquisition module
m12: User speech feature extraction module
m13: System speech feature extraction module
m14: Identification information granting module
m15: Label acquisition module
m16: Model generation module
m17: Model output module
m21: Acquisition module
m22: Recognition module
m23: User speech feature acquisition module
m24: System speech feature acquisition module
m25: Barge-in speech control module
m26: Dialogue control module
m27: Response generation module
m28: Output module
P1: Model generation program
P2: Spoken dialogue program

The invention claimed is:

1. A spoken dialogue system that performs a dialogue with a user by outputting system speech formed by a voice, the spoken dialogue system comprising circuitry configured to:
acquire user speech formed by a voice produced by the user;
output a recognition result obtained by recognizing the user speech acquired by the circuitry as text information;
determine whether to engage barge-in speech which is the user speech produced to cut off ongoing output of the system speech;
output a system response representing response content with which to respond to the user based on the recognition result corresponding to the user speech other than the barge-in speech determined not to be engaged by the circuitry with reference to a dialogue scenario that has a mutual response rule between the user speech and the system speech;
generate the system speech based on the system response output by the circuitry; and
output the system speech,
wherein the user speech is formed by one or more chronological user speech elements,
wherein the dialogue scenario includes a response candidate which is a response assumed for the system speech from the user, and
wherein, when each user speech element corresponds to a predetermined morpheme included in immediately previous system speech which is the system speech output by the circuitry immediately before the user speech is produced by the user and does not correspond to an element of the response candidate to the immediately previous system speech in the dialogue scenario, the circuitry determines not to engage the user speech element or the user speech including the user speech element.

2. The spoken dialogue system according to claim 1, wherein the user speech element is an element obtained by dividing the user speech into times with a predetermined length chronologically, and
wherein each user speech element includes an acoustic feature.

3. The spoken dialogue system according to claim 2, wherein the circuitry determines that the user speech element is not engaged when each user speech element corresponds to an element of predetermined speech set in advance.

4. The spoken dialogue system according to claim 2, wherein the circuitry is further configured to:
acquire a user speech feature series obtained by dividing the user speech into user speech elements of a time with a predetermined length and chronologically disposing acoustic features of the user speech elements based on the user speech; and
acquire a system speech feature series in which acoustic features of the system speech elements obtained by dividing the immediately previous system speech into times with a predetermined length are chronologically disposed, the system speech feature series including identification information attached to a system speech element included in a morpheme which, among morphemes included in the immediately previous system speech, corresponds to a predetermined part of speech and does not correspond to a response candidate acquired from the dialogue scenario and assumed to be the immediately previous system speech by the user among the plurality of system speech elements, wherein the circuitry determines whether to engage each user speech element using a barge-in speech determination model that receives the user speech feature series, the system speech feature series, and the identification information as inputs, and outputs a likelihood of each user speech element not being engaged in dialogue control, each user speech element being included in the user speech.

5. The spoken dialogue system according to claim 4, wherein the circuitry determines that the user speech element is not engaged when each user speech element corresponds to an element of predetermined speech set in advance.

6. The spoken dialogue system according to claim 4,
wherein the barge-in speech determination model is configured by machine learning based on learning data,
wherein the learning data includes feature information including the user speech feature series based on the user speech, the system speech feature series based on the immediately previous system speech output immediately before the user speech, and the identification information granted to a plurality of system speech elements included in the system speech feature series as input values, and includes, as an output value, a correct label associated with the user speech element included in a morpheme that is not engaged in the dialog control of the spoken dialogue system among morphemes included in the user speech.

7. The spoken dialogue system according to claim 6, wherein the circuitry determines that the user speech element is not engaged when each user speech element corresponds to an element of predetermined speech set in advance.

8. The spoken dialogue system according to claim 1, wherein the circuitry determines that the user speech element is not engaged when each user speech element corresponds to an element of predetermined speech set in advance.

9. A model generation device that generates a barge-in speech determination model determining whether to engage barge-in speech which is user speech produced to cut off ongoing output of system speech in a spoken dialogue system performing a dialogue with a user by outputting the system speech formed by a voice with respect to the user speech formed by the voice produced by the user, the model generation device comprising circuitry configured to:

acquire the user speech and immediately previous system speech which is system speech output immediately before the user speech;

extract a user speech feature series obtained by dividing the user speech into user speech elements of a time with a predetermined length and chronologically disposing acoustic features of the user speech elements based on the user speech;

extract a system speech feature series obtained by dividing the immediately previous system speech into system speech elements of a time with a predetermined length and chronologically disposing acoustic features of the system speech elements based on the immediately previous system speech;

grant identification information to the system speech element included in a morpheme which, among morphemes included in the immediately previous system speech, corresponds to a predetermined part of speech and does not correspond to a response candidate acquired from a dialogue scenario that has a mutual response rule between the user speech and the system speech and assumed to be the immediately previous system speech by the user among the plurality of system speech elements included in the system speech feature series;

acquire a correct label associated with the user speech element included in a morpheme that is not engaged in the dialog control of the spoken dialogue system among morphemes included in the user speech;

perform machine learning based on learning data including the user speech feature series, the system speech feature series including the identification information, and the correct label and generate a barge-in speech determination model that receives the user speech feature series based on the user speech and the system speech feature series including the identification information based on the immediately previous system speech as inputs, and outputs a likelihood of each user speech element not being engaged in the dialogue control of the spoken dialogue system as an output, each user speech element being included in the user speech; and output the barge-in speech determination model generated by the circuitry.

10. The model generation device according to claim 9, wherein the circuitry performs morphemic analysis on each of the user speech, the immediately previous system speech, and response candidate assumed as a response to the immediately previous system speech by the user, extracts a morpheme that is not engaged, which is a morpheme included in the immediately previous system speech and not included in the response candidate among morphemes included in the user speech, and associates the correct label with the user speech element included in the morpheme that is not engaged.

* * * * *